US011245471B2

(12) United States Patent
Darbinian et al.

(10) Patent No.: US 11,245,471 B2
(45) Date of Patent: Feb. 8, 2022

(54) PHOTONICS ADAPTIVE BEAM FORMING WITH A POLAR LATTICE COMPRISING OPTICAL PHASED ARRAY RECEIVING ELEMENTS TO RECEIVE THE STEERED OPTICAL BEAM FROM OPTICAL PHASED ARRAY TRANSMITTING ELEMENTS POSITIONED IN A CIRCULAR PATH

(71) Applicant: California Institute of Technology, Pasadena, CA (US)

(72) Inventors: Artsroun Darbinian, Glendale, CA (US); Seyed Ali Hajimiri, La Canada, CA (US); Aroutin Khachaturian, Glendale, CA (US); Seyed Mohammadreza Fatemi, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 16/141,944

(22) Filed: Sep. 25, 2018

(65) Prior Publication Data

US 2019/0132052 A1 May 2, 2019

Related U.S. Application Data

(60) Provisional application No. 62/562,925, filed on Sep. 25, 2017.

(51) Int. Cl.
*G02F 1/29* (2006.01)
*H04B 10/40* (2013.01)
(Continued)

(52) U.S. Cl.
CPC ............. *H04B 10/40* (2013.01); *G02F 1/292* (2013.01); *H01Q 3/2676* (2013.01); *H04B 10/11* (2013.01)

(58) Field of Classification Search
CPC ...... H01Q 3/2676; H04B 10/11; H04B 10/40; A61B 6/12; A61B 90/37; A61B 90/39;
(Continued)

(56) References Cited

U.S. PATENT DOCUMENTS 3,573,773 A * 4/1971 O'Hanlon ............. G01D 5/268
340/870.27
4,427,881 A * 1/1984 Ruell ..................... G01D 5/268
250/227.11
(Continued)

*Primary Examiner* — Que Tan Le
(74) *Attorney, Agent, or Firm* — Ardeshir Tabibi; Weaver Austin Villeneuve & Sampson LLP

(57) ABSTRACT

An optical phased array includes a first multitude of optical transmitting/receiving elements (elements) positioned along a periphery of a first circular path. The phased array may further include a second multitude of optical elements positioned along a periphery of a second circular path concentric with the first circular path, and a third multitude of optical elements positioned along a periphery of a third circular path concentric with the first and second circular paths. The second circular path has a radius that is longer than the radius of the first circular path but shorter than the radius of the third circular. The number of the second multitude of optical elements is greater than the number of the first multitude of optical elements by N elements, and the number of the third multitude of optical elements is greater than the number of the second multitude of optical elements by M elements.

31 Claims, 23 Drawing Sheets

(51) Int. Cl.
*H01Q 3/26* (2006.01)
*H04B 10/11* (2013.01)

(58) Field of Classification Search
CPC .......... G02F 1/292; F24S 23/70; G01D 5/268; G01S 7/003; G02B 6/0006; G02B 6/122; G02B 6/4202; G02B 6/4292; G02B 6/4296
USPC .............................. 250/239, 214.1, 216, 551
See application file for complete search history.

(56) References Cited

U.S. PATENT DOCUMENTS

| | | | | |
|---|---|---|---|---|
| 6,576,889 B2 * | 6/2003 | Borgmann | ............. | B62D 15/02 250/231.13 |
| 7,534,992 B2 * | 5/2009 | Koitabashi | ........... | G02B 6/3604 250/216 |
| 10,224,641 B2 * | 3/2019 | Sundaram | ............ | H01Q 15/244 |

* cited by examiner

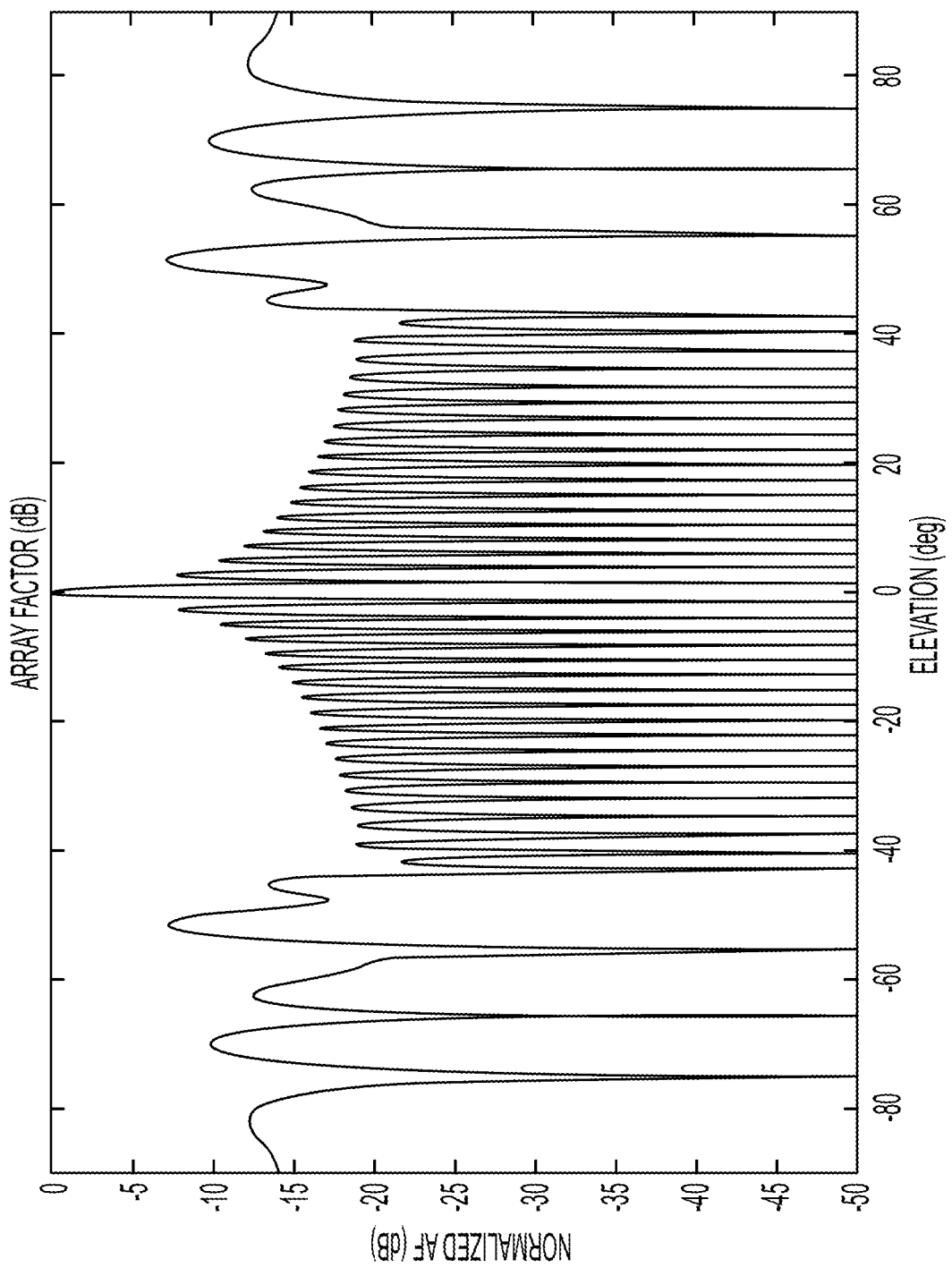

PHOTONICS ADAPTIVE BEAM FORMING WITH A POLAR LATTICE COMPRISING OPTICAL PHASED ARRAY RECEIVING ELEMENTS TO RECEIVE THE STEERED OPTICAL BEAM FROM OPTICAL PHASED ARRAY TRANSMITTING ELEMENTS POSITIONED IN A CIRCULAR PATH

CROSS REFERENCE TO RELATED APPLICATIONS

The present application claims benefit under 35 USC 119(e) of Application Ser. No. 62/562,925, filed Sep. 25, 2017, the content of which is incorporated herein by reference in its entirety.

FIELD OF THE INVENTION

The present invention relates to phased arrays, and more particularly to optical phased arrays.

BACKGROUND OF THE INVENTION

RF and mm-wave phased arrays are being increasingly used in a variety of applications, such as communication, imaging, beam steering, and radar. However, efforts in developing optical phased arrays have had limited success.

Conventional optical phased arrays are formed using such techniques as injection locking of lasers in the array, single laser with array of phase modulators, and phase locking of multiple semiconductor lasers. However, conventional optical phased arrays have a number of disadvantages. For example, they are formed using bulky optical components, require complex control systems to minimize the effect of environment fluctuations, consume a significant area, and are otherwise difficult to scale.

A need continues to exist for an optical phased array that is highly integrated, has an improved performance, and consumes a significantly smaller area than conventional optical phased arrays.

BRIEF SUMMARY OF THE INVENTION

An optical phased array, in accordance with one embodiment of the present invention, includes in part, a first multitude of optical transmitting/receiving elements positioned along a periphery of a first circular path. In one embodiment, the optical phased array further includes, in part, a second multitude of optical transmitting/receiving elements positioned along a periphery of a second circular path concentric with the first circular path. The said second circular path has a radius that is longer than the radius of the first circular path. In one embodiment, the optical phased array further includes, in part, a third multitude of optical transmitting/receiving elements positioned along a periphery of a third circular path concentric with the first and second circular paths. The third circular path has a radius that is longer than the radius of the second circular path.

In one embodiment, the second multitude of optical transmitting/receiving elements is greater than the first plurality of optical transmitting/receiving elements by N transmitting/receiving elements, wherein N is an integer greater than or equal to 1. In one embodiment, the third multitude of optical transmitting/receiving elements is greater than the second plurality of optical transmitting/receiving elements by M transmitting/receiving elements, wherein M is an integer greater than or equal to 1. M and N may or may not be equal to one another.

In one embodiment, a line drawn from a center of the first circular path to one of the first multitude of transmitting/receiving elements crosses one of the second multitude of transmitting/receiving elements. In one embodiment, the optical phased array further includes, in part, a transmitting/receiving element positioned at the center of the first circular path.

In one embodiment, the first multitude of optical transmitting/receiving elements are uniformly distributed along the periphery of the first circular path. In one embodiment, the second multitude of optical transmitting/receiving elements are uniformly distributed along the periphery of the second circular path. In one embodiment, the third multitude of optical transmitting/receiving elements are uniformly distributed along the periphery of the third circular path.

In one embodiment, the first and second circular paths are coplanar. In one embodiment, the first, second and third circular paths are coplanar. In one embodiment, the first circular path is not coplanar with the second circular path. In one embodiment, the first circular path is not coplanar with the second circular path, the first circular path is not coplanar with the third circular path, and the second circular path is not coplanar with the third circular path. In one embodiment, the minima associated with the second circular path is substantially aligned with a secondary maxima associated with the first circular path.

An optical phased array, in accordance with one embodiment of the present invention, includes, in part, a first multitude of optical transmitting elements positioned along a periphery of a first circular path, and a second multitude of optical receiving elements positioned along a periphery of a second circular path concentric with the first circular path. The second circular path has a radius that is greater than the radius of the first circular path. In one embodiment, the optical phased array further includes, in part, a third multitude of optical transmitting elements positioned along a periphery of a third circular path concentric with the first and second circular paths. The third circular path has a radius that is greater than the radius of the second circular path.

A method of wave-front generation or reception, in accordance with one embodiment of the present invention, includes, in part, transmitting an optical signal from each of a first multitude of optical transmitting elements positioned along a periphery of a first circular path. In one embodiment, the method further includes, in part, transmitting an optical signal from each of a second multitude of optical transmitting elements positioned along a periphery of a second circular path concentric with the first circular path. The second circular path has a radius that is greater than the radius of the first circular path. In one embodiment, the method further includes, in part, transmitting an optical signal from each of a third multitude of optical transmitting elements positioned along a periphery of a third circular path concentric with the first and second circular paths. The third circular path has a radius that is greater than the radius of the second circular path.

In one embodiment, the second multitude of optical transmitting/receiving elements is greater than the first multitude of optical transmitting/receiving elements by N transmitting/receiving elements, wherein N is an integer greater than or equal to 1. In one embodiment, the third multitude of optical transmitting/receiving elements is greater than the second plurality of optical transmitting/receiving elements by M transmitting/receiving elements, wherein M is an integer greater than or equal to 1. M and N may or may not be equal to one another.

In one embodiment, the method further includes, in part, transmitting an optical signal from a transmitting element positioned at the center of the first circular path. In one embodiment, the first multitude of optical transmitting elements are uniformly distributed along the periphery of the first circular path. In one embodiment, the second multitude of optical transmitting elements are uniformly distributed along the periphery of the second circular path. In one embodiment, the third multitude of optical transmitting elements are uniformly distributed along the periphery of the third circular path.

In one embodiment, the first and second circular paths are coplanar. In one embodiment, the first, second and third circular paths are coplanar. In one embodiment, the first circular path is not coplanar with the second circular path. In one embodiment, the first circular path is not coplanar with the second circular path, the first circular path is not coplanar with the third circular path, and the second circular path is not coplanar with the third circular path. In one embodiment, the minima associated with the second circular path is substantially aligned with a secondary maxima associated with the first circular path.

A method of wave-front generation or reception, in accordance with one embodiment of the present invention, includes, in part, transmitting an optical signal from each of a first multitude of optical transmitting elements positioned along a periphery of a first circular path, and receiving the optical signal transmitted by the first multitude of optical transmitting elements via a second multitude of optical receiving elements positioned along a periphery of a second circular path concentric with the first circular paths. In one embodiment, the second circular path has a radius that is longer than the radius of the first circular path.

In one embodiment, the method further includes, in part, transmitting an optical signal from each of a third multitude of optical transmitting elements positioned along a periphery of a third circular path concentric with the first and second circular paths, and receiving the optical signal transmitted by the third multitude of optical transmitting elements via the second plurality of optical receiving elements. In one embodiment, the third circular path has a radius that is longer than the radius of the second circular path.

BRIEF DESCRIPTION OF THE DRAWINGS

FIG. 2B shows the broadside array factor associated with a polar grid phased array, in accordance with one embodiment of the present invention.

DETAILED DESCRIPTION OF THE INVENTION

In accordance with one embodiment of the present invention, transmitting and/or receiving elements of a phased array are positioned substantially along the periphery of one or more circles that are concentric, as described further below. The concentric circles may or may not be coplanar.

An isotropic radiator generates concentric spherical waves with an electric field defined by the following expression:

$$E(r) = \frac{C}{r} e^{-jkr} \quad (1)$$

In equation (1) C represents a complex modulating coefficient, r represents the distance from the radiator to a point of observation P, $j=\sqrt{-1}$, $$k = \frac{2\pi}{\lambda},$$

and λ represents the wavelength of the signal being radiated. The electric field generated by an array of such radiators is the superposition of the waves emitted by the individual radiators.

Figure 1:
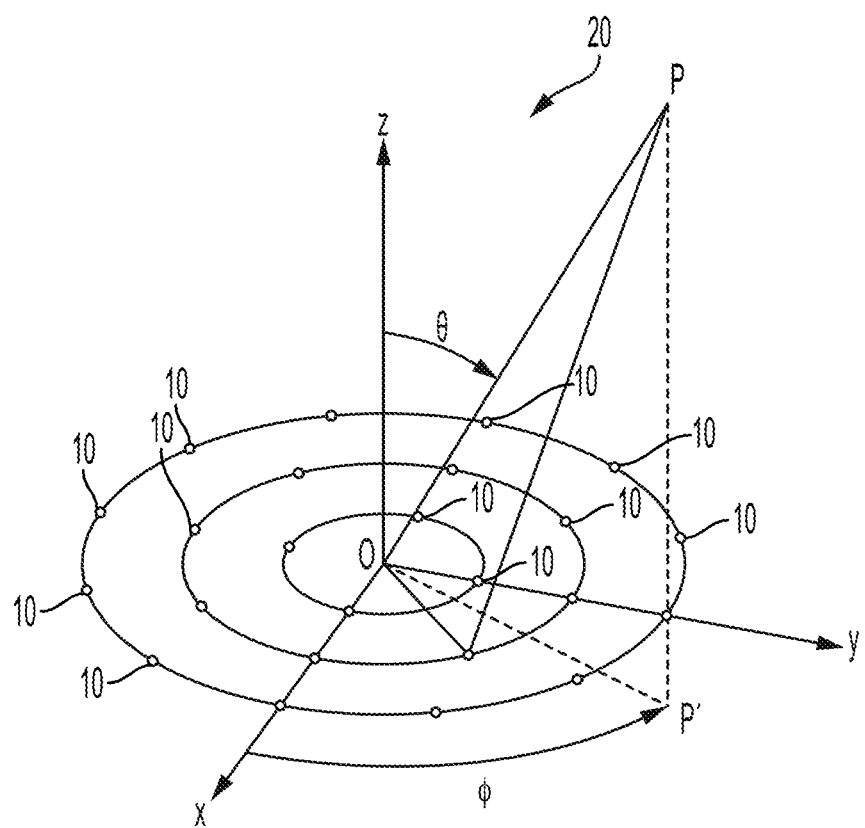
FIG. 1 shows a polar grid phased array, in accordance with one embodiment of the present invention.

FIG. 1 shows a circular planar array (alternatively referred to herein as polar grid phased array or polar phased array) 100 of radiators with multitude of rings (3 of which are shown in FIG. 1) and a multitude of transmitting (or receiving) elements 10 (hereinafter alternatively referred to as elements or radiators) per ring (circle), in accordance with one embodiment of the present invention Although the exemplary embodiment of FIG. 1 is shown as having a multitude of transmitting (or receiving) elements positioned along three concentric circles, it is understood that a polar phased array, in accordance with embodiments of the present invention, may have its transmitting (or receiving) elements positioned along a single circle or any integer number N of concentric circles. Furthermore, any number of such concentric circles may or may not be coplanar with the remaining number of circles. In the example shown in FIG. 1, the first, second and third rings are shown respectively as including 4, 8 and 12 radiators. As seen, the radiators are arranged on concentric circles. The electric field at any point P may be defined as:

$$E(r, \theta, \varphi) = \sum_{m=0}^{M} \sum_{n=1}^{N(m)} C \frac{e^{-jkR_{m,n}}}{R_{m,n}}. \tag{2}$$

In equation (2), r represents the distance between the center of the array O and point P, θ represents the angle between ling OP and the z-axis, φ represents the angle between line OP' and the x-axis where P' is the projection of point P on the x-y axis, M represents the number of rings present in the array (M is 3 in FIG. 1), N(m) represents the number of elements in the $m^{th}$ ring, $C_{m,n}$ represents the modulating coefficient of the $m^{th}$ ring's $n^{th}$ element (herein referred to as the m,$n^{th}$ element) and $R_{m,n}$ represents the distance between the m,$n^{th}$ element and the observation point P. It is understood that m=0 term corresponds to an element at the center of the concentric circles which may or may not include a radiator. It is also understood that N(m) increases by 4 for 1<m<M in this example.

If P is located in the far field, then $R_{m,n} \approx r$, where r is the distance between the center of the array and point P. Equation (2) may then be defined as:

$$E(r, \theta, \varphi) = \sum_{m=0}^{M} \sum_{n=1}^{N(m)} C_{m,n} \frac{e^{-jkR_{m,n}}}{r}. \tag{3}$$

Using the law of cosines, the following equation is obtained:

$$R_{m,n}^2 = r^2 + a_m^2 r a_m \cos(\gamma_{m,n}) \tag{4}$$

In equation (4), $a_m$ represents the radius of the $m^{th}$ ring and $\gamma_{m,n}$ is the angle between line OP and a vector between the origin O and the m,$n^{th}$ element. In the far field $r^2 \gg a_m^2$, therefore the above equation (4) may be rewritten as:

$$R_{m,n} \approx \sqrt{r^2 - 2ra_m \cos(\gamma_{m,n})} \tag{5}$$

Equation (5) may be linearized to:

$$R_{m,n} \approx r - a_m \cos(\gamma_{m,n}). \tag{6}$$

Furthermore, $\gamma_{m,n}$ may be expressed in terms of spherical coordinates θ and φ by coordinate geometry as:

$$\cos(\gamma_{m,n}) = \sin\theta \cos(\varphi - \varphi_{m,n}) \tag{7}$$

In equation (7), parameters θ and φ represent the elevation and azimuth angles of the observation vector P, and parameter $\varphi_{m,n}$ represents the azimuth angle of the m,$n^{th}$ element of the array. Thus, equation (6) may be written as:

$$R_{m,n} = r - a_m \sin\theta \cos(\varphi - \varphi_{m,n}), \tag{8}$$

By combining equations (3) and (8), it is shown that:

$$E(r, \theta, \varphi) = \sum_{m=0}^{M} \sum_{n=1}^{N(m)} C_{m,n} \frac{e^{-jk(r-a_m \sin\theta\cos(\varphi-\varphi_{m,n}))}}{r}, \tag{9}$$

$$= \frac{e^{-jkr}}{r} \sum_{m=0}^{M} \sum_{n=1}^{N(m)} C_{m,n} e^{jka_m \sin\theta\cos(\varphi-\varphi_{m,n})}$$

Equation (9) is the product of a radially dependent term and an angularly dependent term. The angularly dependent term is referred as the array factor:

$$A(\theta, \varphi) = \sum_{m=0}^{M} \sum_{n=1}^{N(m)} C_{m,n} e^{jka_m \sin\theta\cos(\varphi-\varphi_{m,n})} \tag{10}$$

The modulating coefficients $C_{m,n}$ may be expressed as the product of an amplitude $C_{m,n}$ and phase $\beta_{m,n}$:

$$C_{m,n} = c_{m,n} e^{\beta_{m,n}} \tag{11}$$

In order to point the main lobe of the array to a desired direction defined by $(\theta_0, \varphi_0)$, parameter $\beta_{m,n}$ is selected so as to maximize the array factor when $(\theta,\varphi)=(\theta_0,\varphi_0)$ which is equivalent to having the radiated waves of all the array elements appear in phase at the desired direction, which is in turn equivalent to the array factor having a phase equal to zero at the desired direction:

$$A(\theta = \theta_0, \varphi = \varphi_0) = \sum_{m=0}^{M} \sum_{n=1}^{N(m)} c_{m,n} e^{\beta_{m,n}} e^{jka_m \sin\theta_0 \cos(\varphi_0 - \varphi_{m,n})} \tag{12}$$

$$= \sum_{m=0}^{M} \sum_{n=1}^{N(m)} c_{m,n} e^{jka_m \sin\theta_0 \cos(\varphi_0-\varphi_{m,n})+\beta_{m,n}}$$

$$= \sum_{m=0}^{M} \sum_{n=1}^{N(m)} c_{m,n}$$

The above is true for:

$$\beta_{m,n} = -jka_m \sin\theta \cos(\varphi_0 - \varphi_{m,n}). \tag{13}$$

Therefore, the general expression for the array factor for a polar grid phased array may be written as:

$$A(\theta, \varphi) = \sum_{m=0}^{M} \sum_{n=1}^{N(m)} c_{m,n} e^{jka_m(\sin\theta\cos(\varphi-\varphi_{m,n})-\sin\theta_0\cos(\varphi_0-\varphi_{m,n}))}. \tag{14}$$

Regular Element Placement

If the number of elements in each ring (concentric circle) increases linearly with the index m of the ring, then:

$$N(m) = mn_0 \tag{15}$$

In equation (15), $n_0$ represents the number of elements in the first ring and the number of elements added to each subsequent ring. Furthermore, if elements along a particular radius are regularly spaced, then it is seen that:

$$\varphi_{m,n} = 2\pi \frac{n}{N(m)}.$$
$$2\pi \frac{n}{mn_0}$$

Furthermore, if the radius of each ring increases linearly with its index m, then:

$$a_m = m a_0 \quad (17)$$

where $a_0$ represents the radius of the first ring. Combining these results with equation (14) it is seen that:

$$A(\theta, \varphi) = c_0 + \sum_{m=1}^{M} \sum_{n=1}^{mn_0} c_{m,n} e^{jkma_0 \left(\sin\theta\cos\left(\varphi - 2\pi\frac{n}{mn_0}\right) - \sin\theta_0\cos\left(\varphi_0 - 2\pi\frac{n}{mn_0}\right)\right)}. \quad (18)$$

In equation (18) the contribution of the center element has been removed from the sum.

Simplification for Even $n_0$

Equation (18) shows that the argument of the cosine function in the exponent has a factor of $2\pi$ which is split into $mn_0$ elements in the course of the summation. If $n_0$ is even, then the phase shift is split into two distinct groups: one with phase shifts running from $$\frac{2\pi}{mn_0} \text{ (at } n=1) \text{ to } \pi \left(\text{at } n = \frac{mn_0}{2}\right)$$

and the other running from $$\pi + \frac{2\pi}{mn_0} \left(\text{at } n = \frac{mn_0}{2} + 1\right) \text{ to } 2\pi \text{ (at } n = mn_0).$$

Each element in the second group will be equal to an element from the first group with an additional $\pi$ phase shift. Thus, the periodicity of the cosine function may be used to remove the $\pi$ phase shift from the elements of the second group by using a negative sign as shown below:

$$\cos(x+\pi) = -\cos x \quad (19)$$

Thus, the first half of the exponential terms in equation (18) has the opposite sign of the second half, which enables reducing the upper limit of the inner summation by a factor of two, and invoking the Euler formula to rewrite the array factor as a sum of cosines instead of a sum of complex exponentials, as shown below:

$$A(\theta, \varphi) = c_0 + 2 \quad (20)$$

$$\sum_{m=1}^{M} \sum_{n=1}^{\frac{mn_0}{2}} c_{m,n} \cos\left(ka_m\left(\sin\theta\cos\left(\varphi - 2\pi\frac{n}{mn_0}\right) - \sin\theta_0\cos\left(\varphi_0 2\pi\frac{n}{mn_0}\right)\right)\right)$$

Simplification for Closely Spaced Elements

If the spacing between elements in each ring is relatively small, the array may be approximated as a set of continuous rings (similar to a characteristic Airy disk). Assume a uniform polar grid phased array (PGPA) at broadside ($\theta_0$, $\varphi_0 = 0°$, $0°$) with uniform amplitude excitation ($c_{m,n}=1$). In this case equation (14) simplifies to $$A(\theta, \varphi) = \sum_{m=0}^{M} \sum_{n=1}^{N(m)} e^{jka_m(\sin\theta\cos(\varphi - \varphi_{m,n}))}. \quad (21)$$

If each ring has a relatively large number of elements, the spacing between elements in each ring is relatively small. Therefore, the angle between elements on the same ring is small. Accordingly, the inner sum may be expressed as an integral over the azimuthal coordinate (instead of a sum of $N(m)$ elements), as shown below:

$$A(\theta, \varphi) = \quad (22)$$

$$\sum_{m=0}^{M} \sum_{n=1}^{N(m)} e^{jka_m(\sin\theta\cos(\varphi - \varphi_{m,n}))} \approx \sum_{m=0}^{M} \int_{0}^{2\pi} e^{jka_m(\sin\theta\cos(\varphi - \varphi_{m,n}))} d\varphi_{m,n}.$$

Because of the azimuthal symmetry, the solution is independent of the azimuthal coordinate $\varphi$ at which the array factor is evaluated. Assume $\varphi = 0$. Furthermore, the cosine function is even, therefore, the negative sign in front of $\varphi_{m,n}$ may be removed. The above equation then may be written as:

$$\sum_{m=0}^{M} \int_{0}^{2\pi} e^{jka_m(\sin\theta\cos(\varphi - \varphi_{m,n}))} d\varphi_{m,n}. \quad (23)$$

The integral in equation (23) may be viewed as a zeroth order Bessel function of the first type as shown below:

$$J_0(z) = \frac{1}{2\pi} \int_{0}^{2\pi} e^{j\cos\varphi} d\varphi \quad (24)$$

where $z = ka_m \sin\theta$. Thus, the array factor may be simplified to:

$$2\pi \sum_{m=0}^{M} J_0(ka_m \sin\theta).$$

The Bessel function has a single peak. Therefore, the peaks of a sum of Bessel functions add. Thus, the array factor is expected to have a single main lobe. Furthermore, the roots of the Bessel function are not periodic in general, so the sidelobes do not add constructively for all $\theta$.

Figure 2A:
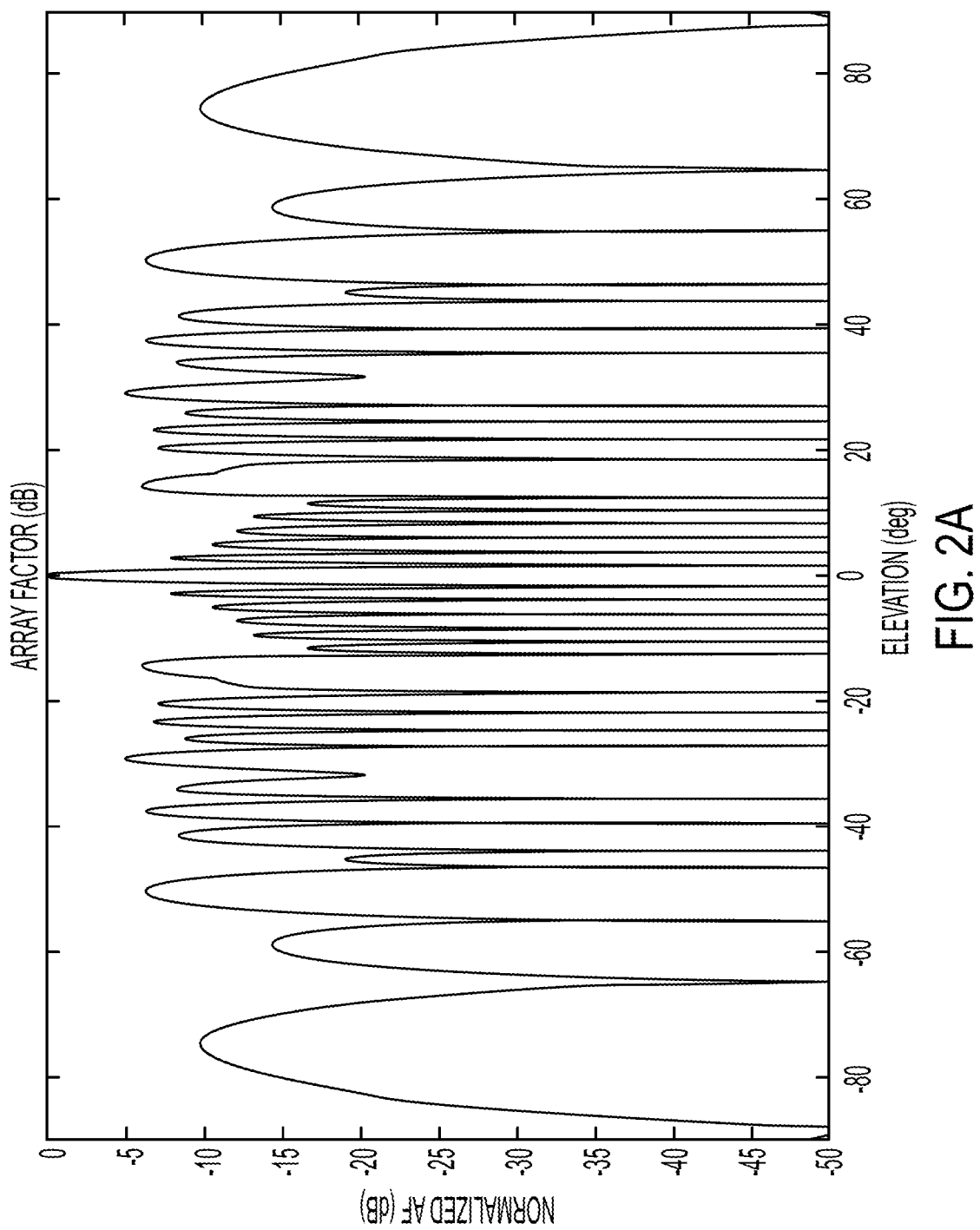
FIG. 2A shows the broadside array factor associated with a polar grid phased array, in accordance with one embodiment of the present invention.

FIG. 2A show the broadside array factors with linear densities of and FIG. 2B show the broadside array factors with linear densities of $$\frac{3}{2\pi}$$

elements per μm at the wavelength of $\lambda = 1550$ nm. In other words, the PGPA associated with FIG. 2A has 20 elements distributed uniformly along the periphery of a circle (circular path) having a radius of 20 µm, and the PGPA associated with FIG. 2B has 60 elements distributed uniformly along the periphery of a circular path having a radius of 20 µm. Both array responses have a region with a single peak at the center and decreasing sidelobes. Consider the range of θ before the large sidelobes appear. For the response shown in FIG. 2A, this region is roughly between ±15° and for the response shown in FIG. 2B it is between ±40°. This region of both responses is equivalent to the Bessel approximation derived above. Outside this range, sidelobes uncharacteristic of the Bessel function appear in the response. Thus, increasing the linear density of elements increases the "Bessel Region" of the array factor.

Figure 3A:
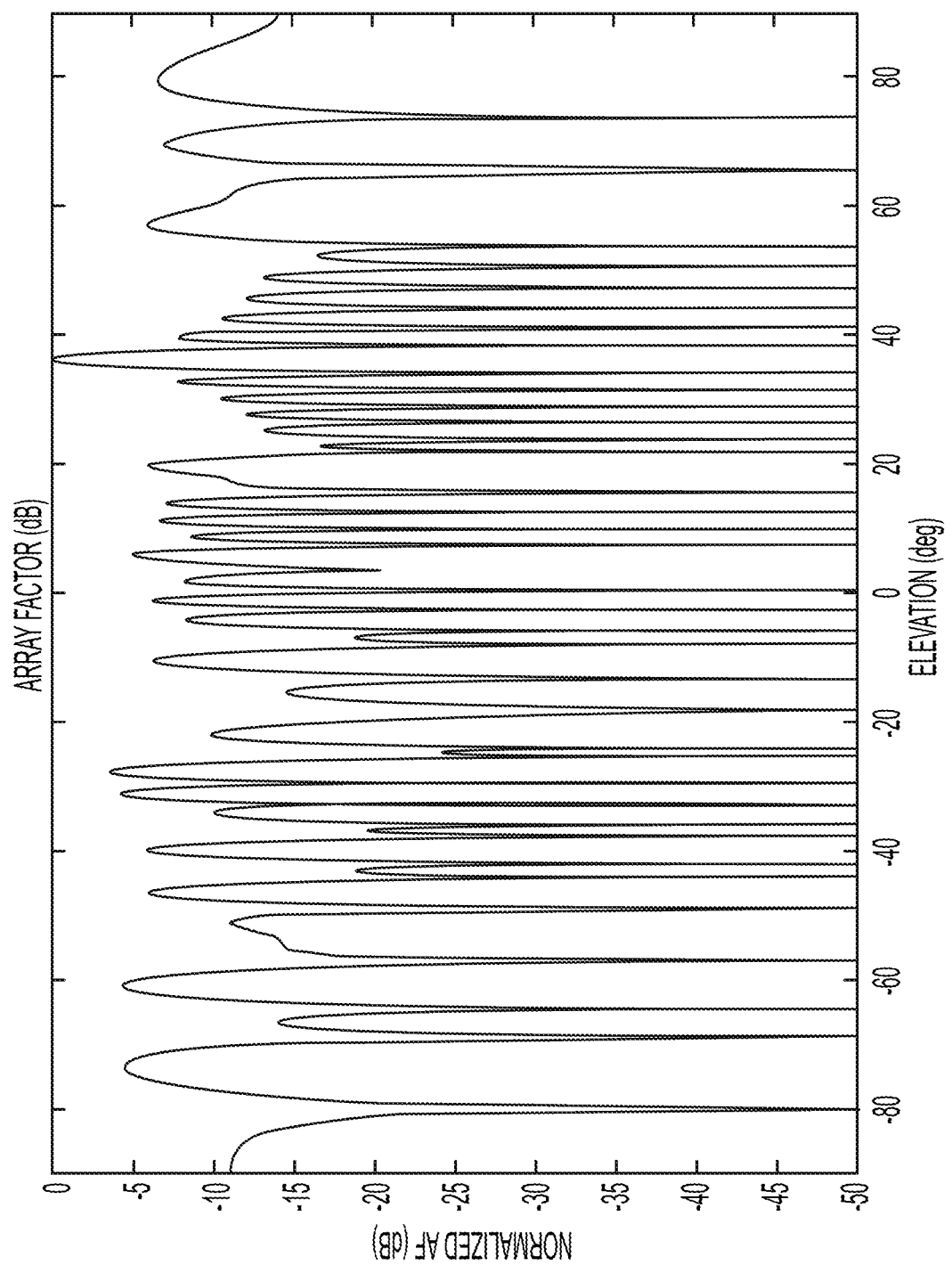
FIG. 3A shows the broadside array factor associated with a polar grid phased array, in accordance with one embodiment of the present invention.
Figure 3B:
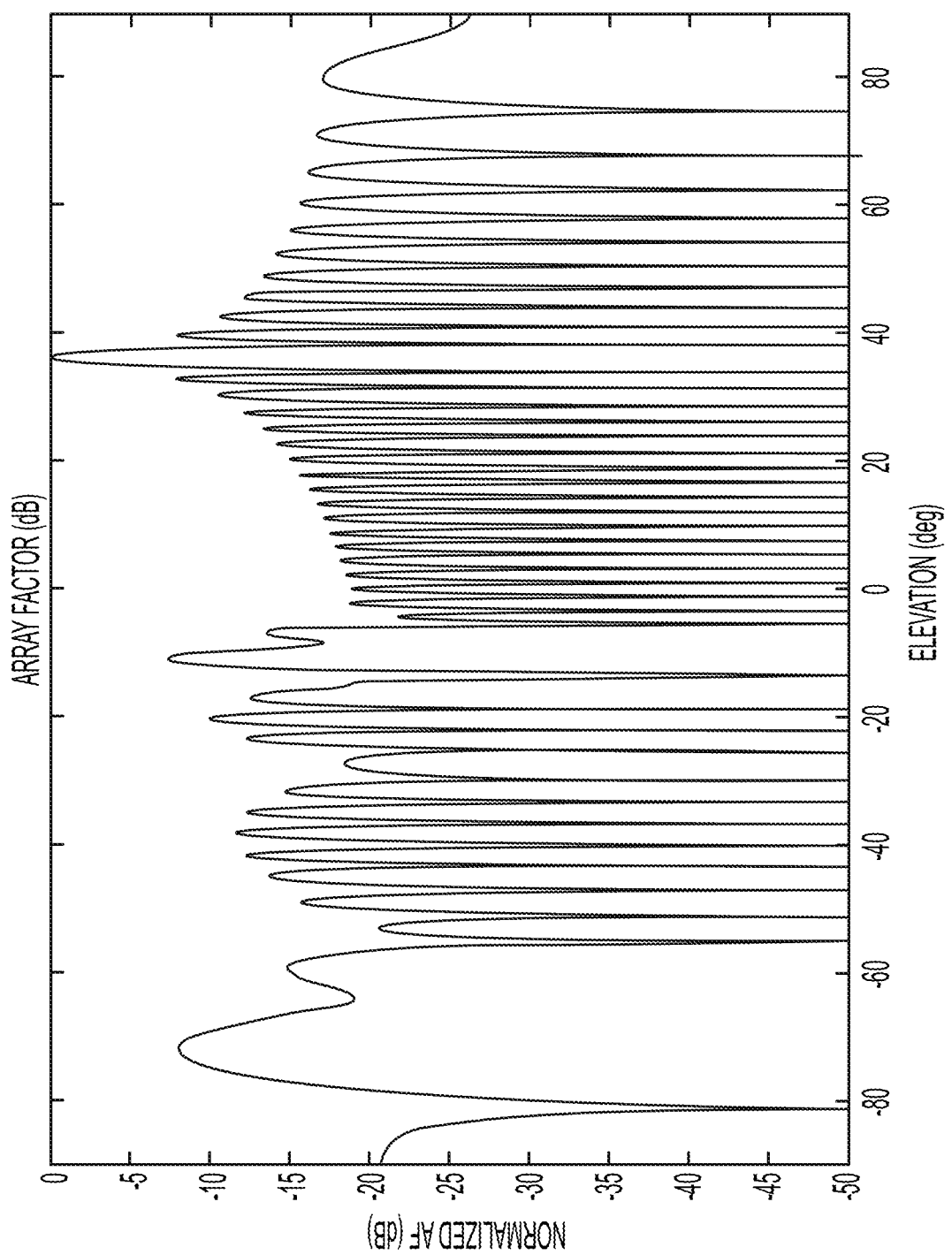
FIG. 3B shows the broadside array factor associated with a polar grid phased array, in accordance with one embodiment of the present invention

The simplification shown above is derived for the case of a broadside array, but it is valid for a steered array as well. FIG. 3A shows the array factor associated with the PGPA of FIG. 2A with the following parameters $(\theta_0, \varphi_0 = 36°, 72°)$. FIG. 3B shows the array factor associated with the PGPA of FIG. 2B with the following parameters $(\theta_0, \varphi_0 = 36°, 72°)$. It is clear that the Bessel regions have not changed.

The Bessel Approximation provides an explanation as to why the PGPA nulls the grating lobes, as described further below.

Tradeoffs of Planar Phased Array Design

An ideal phased array has an array factor with a single sharp peak at a desired direction $(\theta_0, \varphi_0)$. This peak would move with the relative phase between elements of the array so as to always point at the desired target. Conventional array factors do not have such characteristics. First, the peak of the array factor at a desired direction has a finite width, which reduces the resolution of the array. For example, a receiver array may be electronically steered to an elevation of 30° but the array may pick up signals between 28° and 32°.

A convenient metric to quantify an array's ability to resolve details is the array's beamwidth, defined herein as the angular width over which the normalized array factor is higher than −3 dB. A narrow beamwidth is critical for an array to resolve fine details. An array's beamwidth may be narrowed by increasing the number of elements in the array or by increasing inter-element spacing. Both these techniques have their drawbacks. Increasing the number of elements in the array introduces practical issues such as routing of electrical or optical signals. Increasing the number of elements in the array also requires complex drive circuitry to manage the large array, and further causes an increase in the power consumption. Increasing the inter-element spacing introduces grating lobes, as described further below.

Another challenge with conventional phased arrays is aliasing at large element spacing. If inter-element spacing exceeds half the wavelength of the received or transmitted radiation, extra peaks begin to appear in the array factor and which have the same magnitude as the main, desired peak. Such peaks are known as grating lobes. As spacing exceeds more multiples of $$\frac{\lambda}{2},$$

more grating lobes appear and get closer to the main lobe. This limits the field of view of the array. For example, an array may achieve a reasonable beamwidth at the expense of grating lobes every 10°. As a result, if the beam were to be steered to 10°, information at this elevation would not be discernible from information at 0°, −10°, 20°, and the like. Thus, the array would be restricted to scanning angles between ±10°, resulting in a 20° field of view.

Although grating lobes can be avoided by choosing a small inter-element spacing, this option is not attainable for large planar arrays due to routing constraints. In particular, phased arrays for optical applications operate with wavelengths on the order of a micrometer. The radiating elements of such arrays are larger than this dimension thus rendering the grating lobes unavoidable. Thus, the field of view must be sacrificed. For certain applications, this can result in a field of view of no more than a few degrees.

Advantages of the Polar Grid Phased Array

A polar grid phased array, in accordance with one embodiment of the present invention, is adapted to nullify grating lobes, thus eliminating the tradeoff between field of view and beamwidth. Such an array is suitable for use in applications requiring a large field of view in conjunction with large inter-element spacing. A polar grid phased array, in accordance with one embodiment of the present invention, is scalable. Because in a polar grid phased array, in accordance with one embodiment of the present invention, inter-element spacing does not cause grating lobes, the spacing between elements may be made as large as necessary to accommodate electrical and optical routing and to achieve a relatively very narrow beamwidth. Furthermore, elements can be added to the array to further decrease beamwidth. An arbitrarily narrow beamwidth with no grating lobes are characteristic of the array factor of an ideal phased array. Thus, a polar grid phased array, in accordance with embodiments of the present invention, nearly achieves the performance characteristics of an ideal phased array.

A polar grid phased array (PGPA), in accordance with embodiments of the present invention, is highly practical and relatively easy to implement. Elements may be regularly spaced from each other thus inhibiting the thinning of the array. This makes element placement and routing highly systematic. The combination of scalability and ease of systematic design makes a PGPA, in accordance with embodiments of the present invention, suited for numerous applications, as described further below.

The PGPA is also optimal in terms of area. Because the array elements are distributed more efficiently, the dimensions of the array are smaller compared to a rectangular array that includes a similar number of elements. This makes the PGPA ideal for applications where area is a factor, such as aircraft radar or underwater acoustics.

EXAMPLES

Below are a few examples of a PGPA, in accordance with embodiments of the present invention. In the following plots, the array factor of the PGPA is shown in red color and the array factor of a comparable rectangular (Cartesian) phased array (also referred to herein as rectangular grid) is shown in blue color. Arrays with regular element spacing are considered further below. The PGPA array factor is calculated using Equation (18) and the rectangular grid array factor is calculated using well-known equations. For consistency, all simulations are performed at the wavelength λ=1550 nm, but results hold for all wavelengths. Also, all array elements are simulated as isotropic radiators.

Figure 4A:
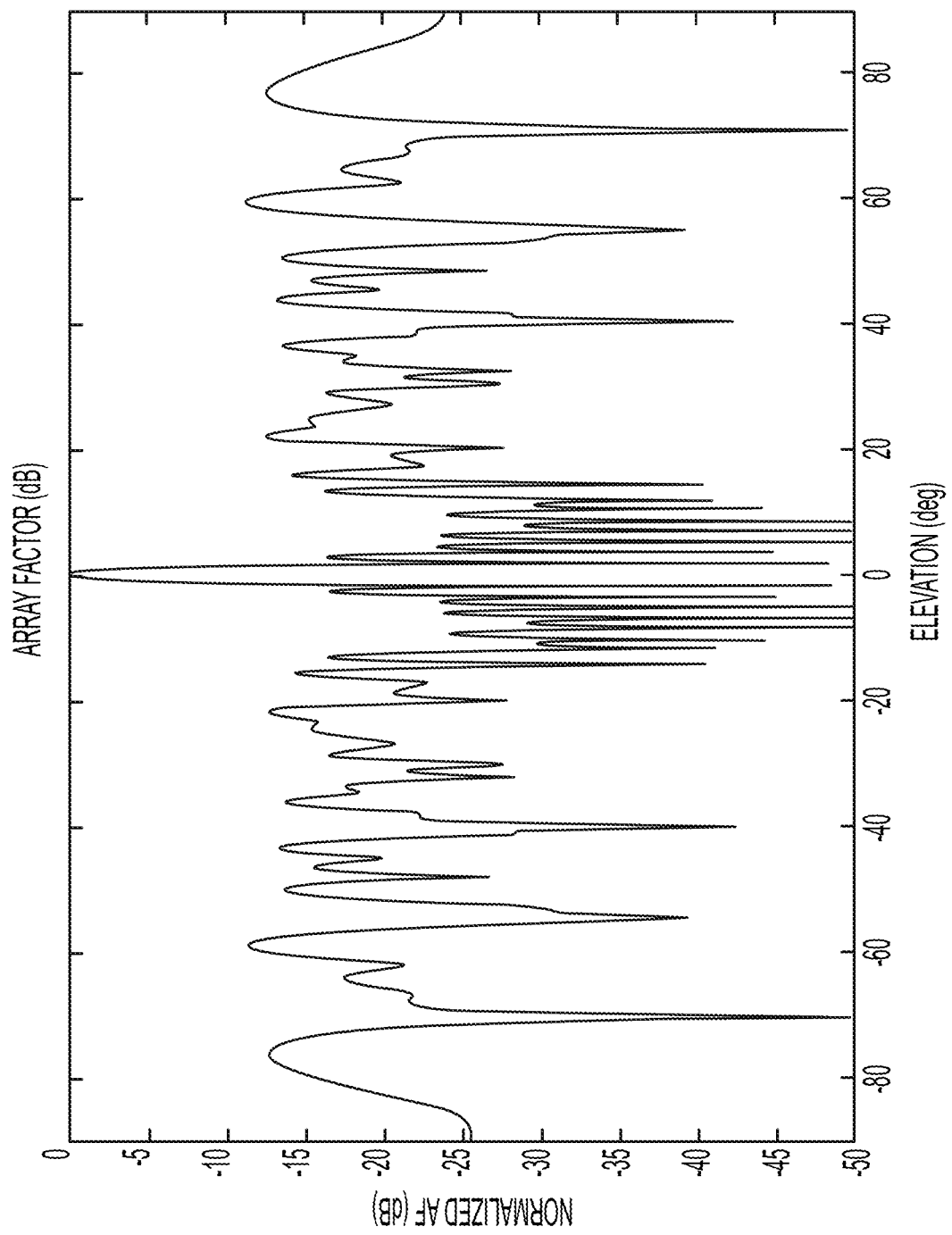
FIG. 4A shows the array factor of a polar grid phased array, in accordance with another embodiment of the present invention.
Figure 4B:
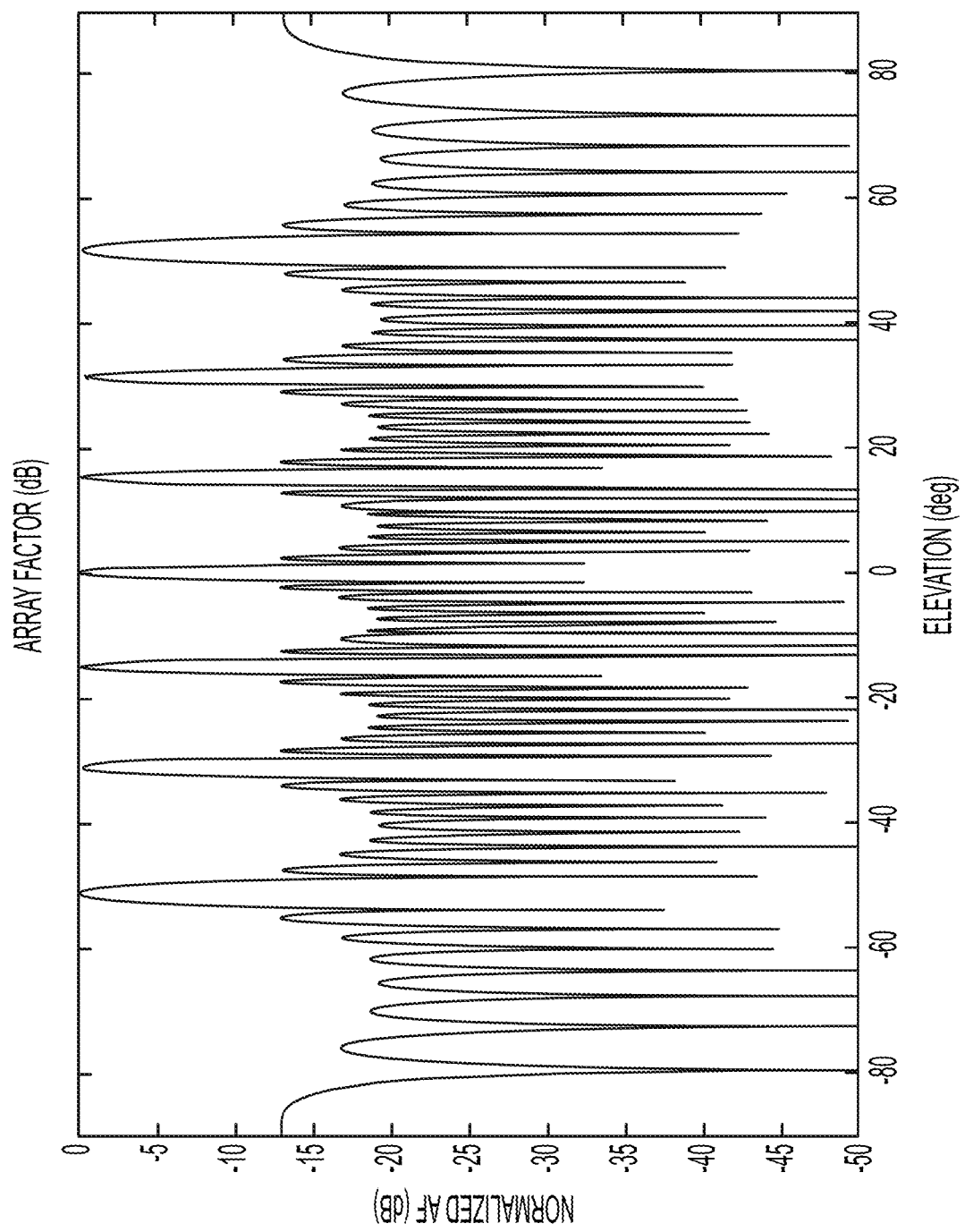
FIG. 4B shows the array factor of a rectangular grid phased array.

FIG. 4A shows the array factor of a PGPA steered to $(\theta_0, \varphi_0 = 0°, 0°)$ with $M=4$ (i.e., 4 rings), $n_0 = 7$ (7 additional elements per ring) and $a_0 = 6$ µm at the $\varphi = 0$ plane. The PGPA array has 70 elements. The rectangular array, shown for comparison, has 81 elements arranged in a 9×9 grid (array)

with 6 μm spacing. It is seen that the PGPA has no grating lobes and most sidelobes are below −15 dB, with the worst sidelobe being at −10 dB. Therefore, the PGPA does not suffer from a field of view limitations and is thus highly advantageous. The array factor for the rectangular array shown in FIG. 4B however, has a 30° field of view. The 3-dB beamwidth of the PGPA is about 1.8° and is no worse than that of the rectangular array. Thus, the PGPA, in accordance with embodiments of the present invention, outperforms a similar rectangular grid array in all figures of merit, despite the fact that it has fewer elements than the rectangular array.

Figure 5A:
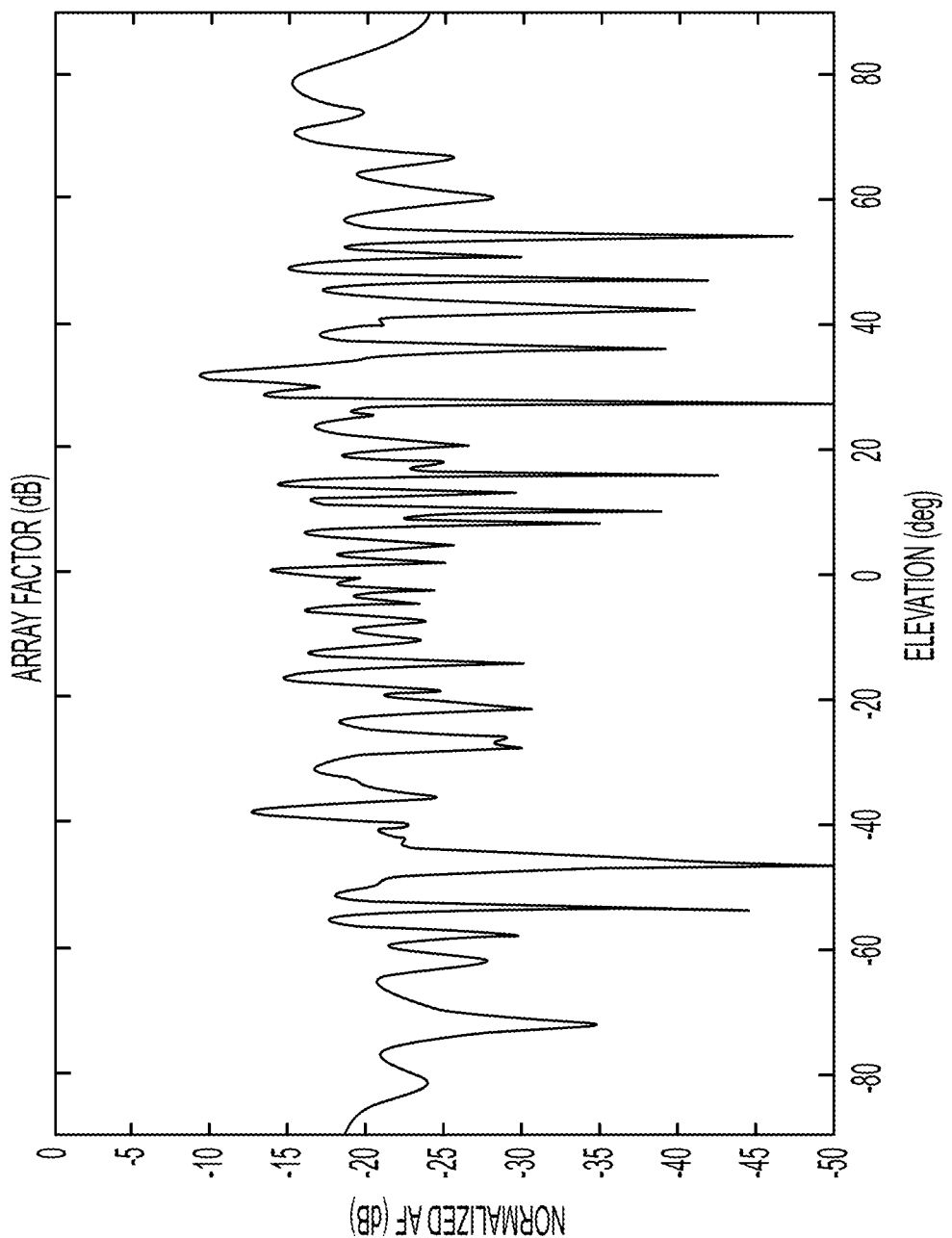
FIG. 5A shows the array factor of a polar grid phased array, in accordance with another embodiment of the present invention.
Figure 5B:
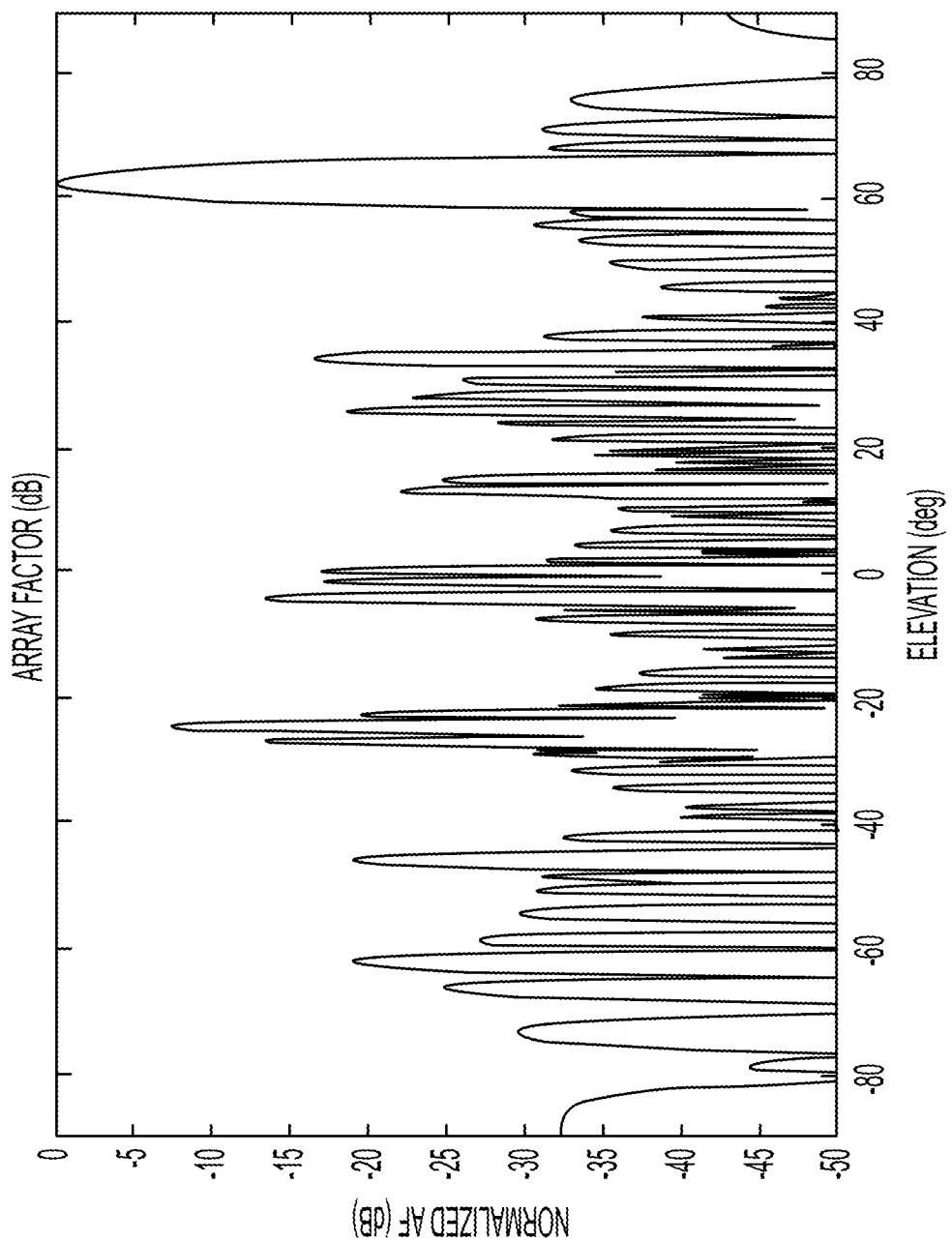
FIG. 5B shows the array factor of a rectangular grid phased array.

FIGS. 5A and 5B show the array factors of the polar grid phased array and the rectangular array as those shown in FIG. 4 except that in FIG. 5, the beam is steered to ($\theta_0$, $\varphi_0$=36°, 0°) at the $\varphi$=144° plane. Thus, an ideal array would not pick up any signals, since the beam has been steered to a different $\varphi$-plane than the one being looked at by the array factor. It is seen that the rectangular grid array suffers from picking up stray signals, as shown in FIG. 5B, in this configuration as it receives unwanted signals at $\theta$=60° with a −1 dB attenuation. However, the PGPA is able to reject this signal, as seen from FIG. 5A. It is also seen that since the elements of a PGPA are distributed in a more area-efficient manner, the PGPA, in accordance with embodiments of the present invention, requires less area than a similar rectangular grid array.

Figure 6A:
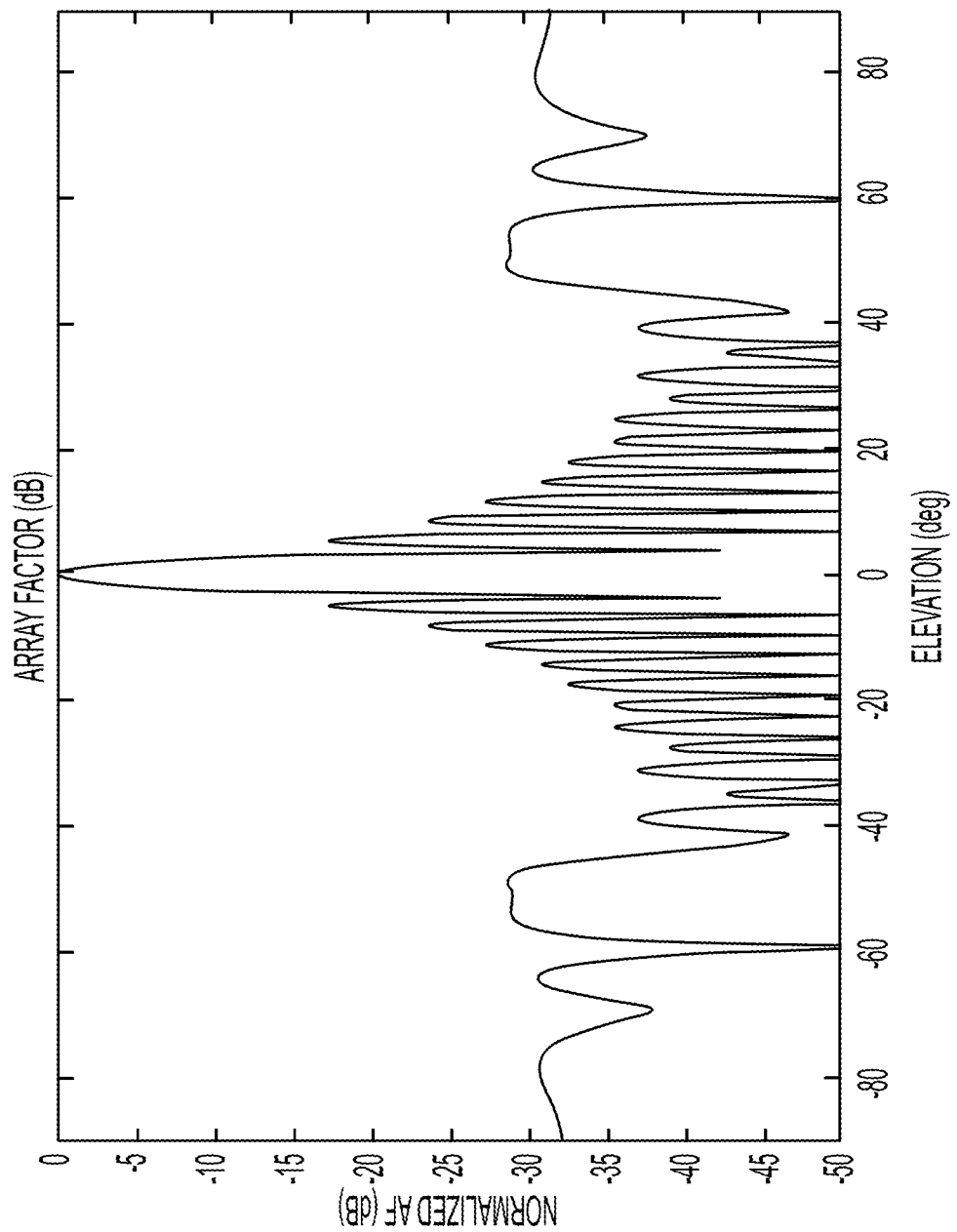
FIG. 6A shows array factor of a polar grid phased array, in accordance with another embodiment of the present invention.
Figure 6B:
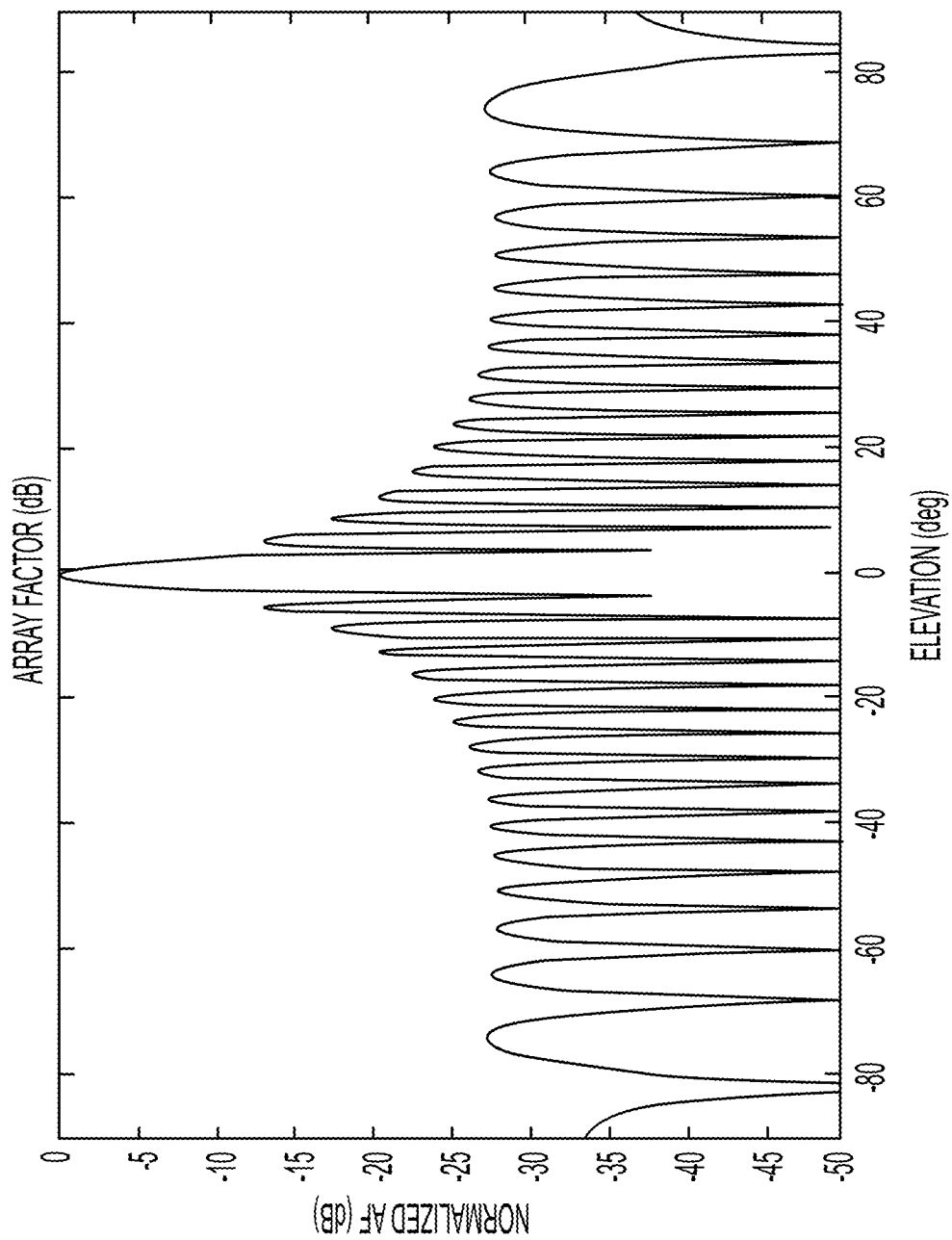
FIG. 6B shows the array factor of a rectangular grid phased array.

FIG. 6B shows an example of a rectangular array which has been designed for full field of view by keeping a small inter-element spacing of 1 μm. The array has been steered to ($\theta_0$, $\varphi_0$=36°, 0°) at the $\varphi$=0° plane. The only known way to improve the beamwidth of such a rectangular array without jeopardizing its field of view is to increase the number of its elements. For example, a 25×25 array, with a total element count of 625, is required for a beamwidth of 3.2°.

A polar grid phased array with the same inter-radial spacing ($a_0$=1 μm) meets the same specifications with only half the number of elements. The polar grid phased array of FIG. 6A has M=14 rings and $n_0$=3 additional elements per ring, and thus has a total element count of 315. Thus, the power consumption of the PGPA is reduced by a factor of two compared to a rectangular array. Also, the PGPA requires less area, not only because its elements are distributed more efficiently but also because it has fewer elements. Furthermore, although the inter-radial spacing $a_0$=1 μm, the arc length between adjacent elements along the same ring is not necessarily equal to $a_0$. In the current example, this length is slightly above 2 μm. This provides even further space for electrical or optical routing between the elements. As is also seen, the sidelobe levels of the PGPA are lower than those of rectangular array.

The Bessel Approximation may be applied to a PGPA to selectively null sidelobes by choosing rings whose Bessel functions have overlapping minima and maxima. For example, an arbitrary radius may be selected for the first ring. The maximum sidelobe level of the ring will occur at an angel $\theta$ for which the corresponding Bessel function has its secondary maxima (the first maximum corresponds to the main lobe). The next ring may be selected so that its first minima aligns with the secondary maxima of the first ring, therefore nulling this sidelobe. The resultant array factor will have a maximum sidelobe level at another $\theta$. The next ring may then be selected to null the next sidelobe, and the process may be repeated for a desired number of rings. The advantage of this process is that the maxima of the Bessel function decays with $\theta$ (as shown in FIGS. 2 and 3). Therefore, the sidelobe levels may be reduced significantly to the point that adding more rings does not nulls any further sidelobes.

The above examples show that a PGPA may be applied to arrays of many different types of elements, including antennas, waveguides, acoustic transducers, and the like. In accordance with embodiments of the present invention, by changing the spacing as described above, the conditions for the selected wavelengths may be achieved.

Optical Polar Phased Array Grid

Figure 7A:
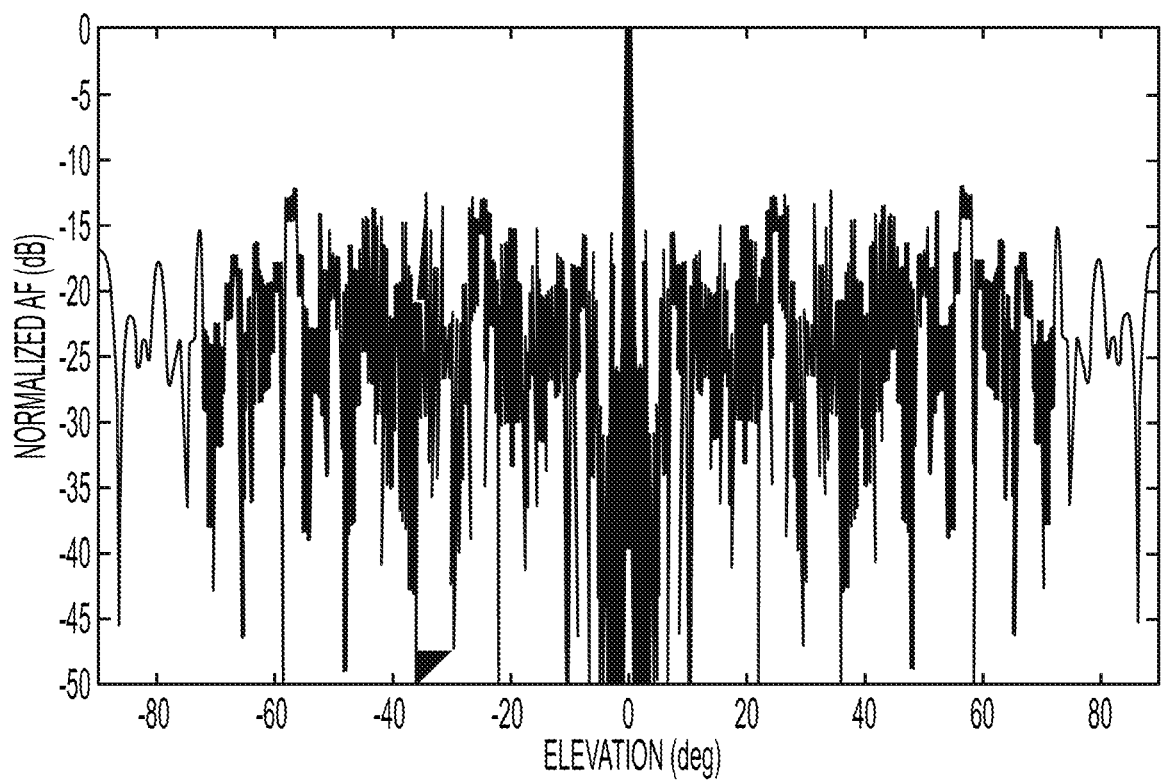
FIG. 7A shows the array factor of an optical polar phased array grid, in accordance with one embodiment of the present invention.
Figure 7B:
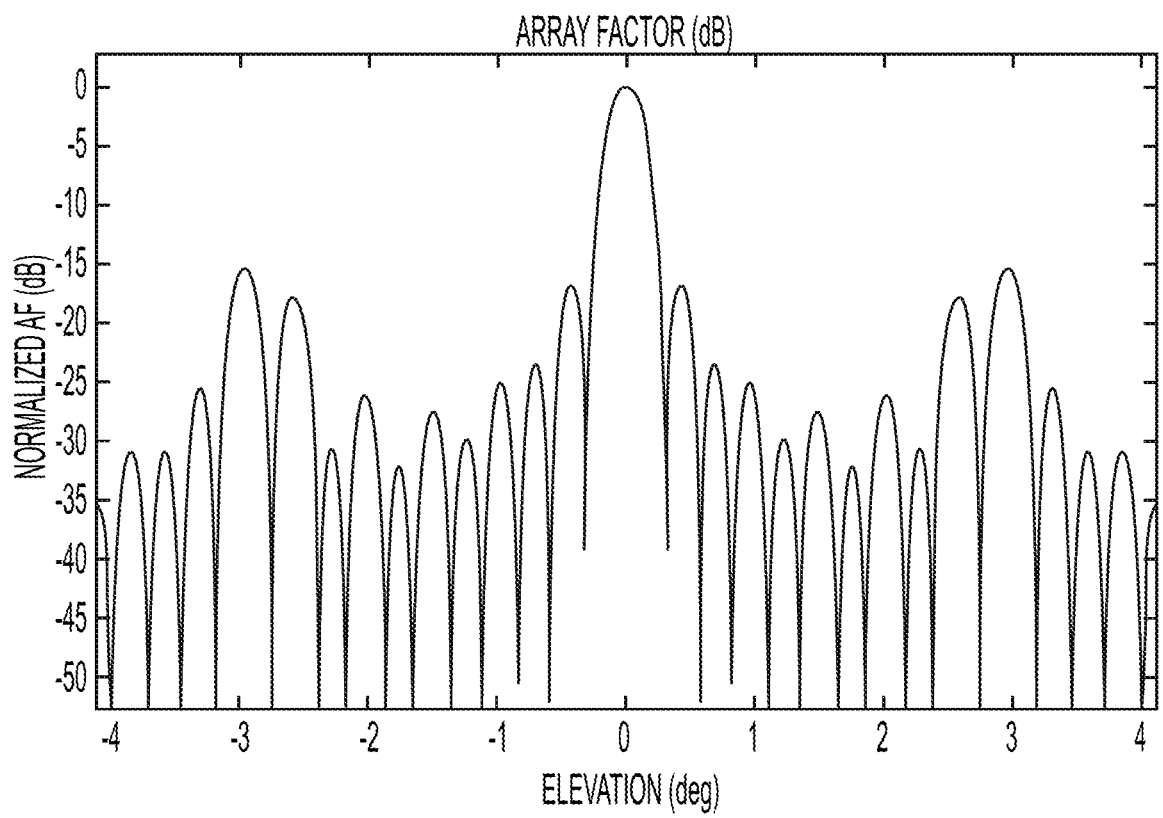
FIG. 7B shows the characteristics of the plot shown in FIG. 7A around the main beam.

FIG. 7A shows the array factor of a PGPA with ($\theta_0$, $\varphi_0$=0°, 0°) with $\varphi$=0°). The array is assumed to have 5 rings with each ring including 13 more elements than an immediately preceding ring (i.e., it is a 5×13 PGPA). The worst case sidelobes are shown as being below −12 dB and occur around $\theta$=±56°. A significant majority of sidelobes are also seen as being advantageously below −15 dB. Furthermore, to the extent that the receiving or transmitting pattern of an optical radiator provides an additional 3-4 dB of attenuation past a certain range of $\theta$, the sidelobes may be reduced even further. FIG. 7B shows the characteristics of the plot shown in FIG. 7A around the main beam, in which all sidelobes are seen as being below −15 dB.

Figure 8A:
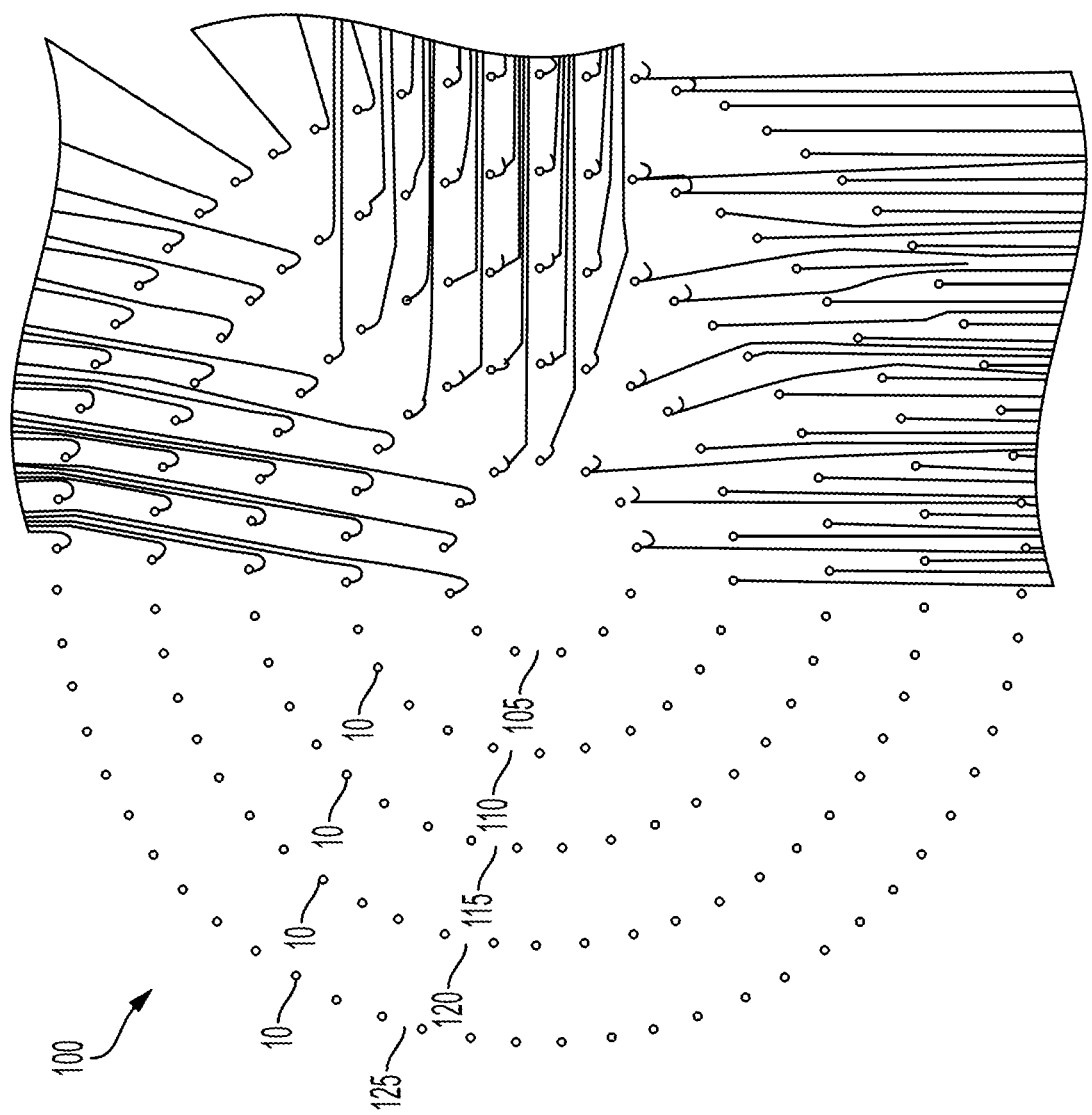
FIG. 8A shows a layout of an exemplary optical polar phased array grid, in accordance with one exemplary embodiment of the present invention.
Figure 8B:
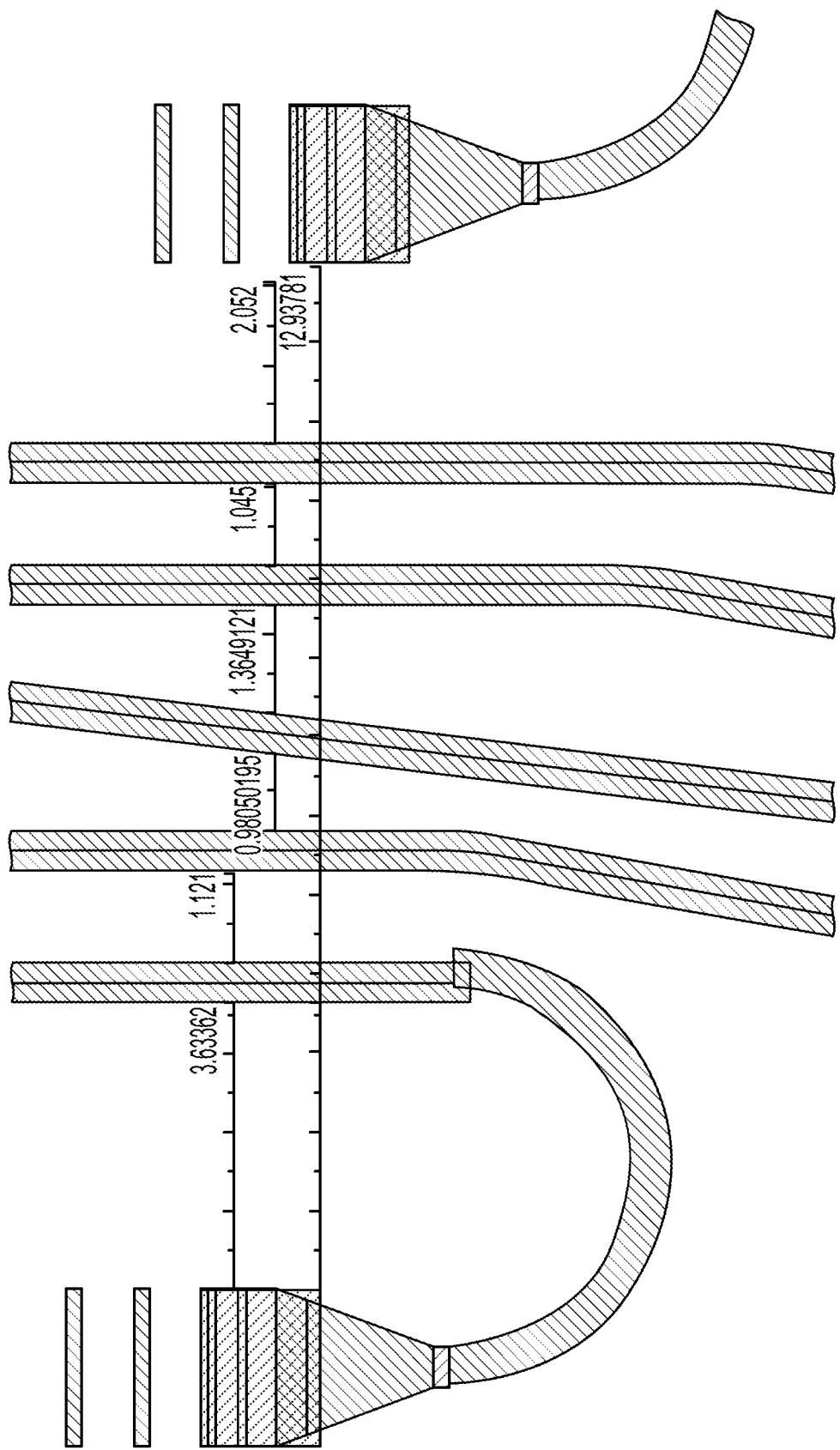
FIG. 8B shows an expanded view of a portion of the layout shown in FIG. 8A.

FIG. 8A shows a layout of an optical PGPA 100, in accordance with one exemplary embodiment of the present invention. Optical PGPA 100 is shown as including five concentric circles (ring), namely rings 105, 110, 115, 120 and 125, along the periphery of each of which a multitude of optical elements 10 are disposed. Each optical element may be a grating couplers, such as a 5×2 grating coupler. For example, ring 105 is shown as including 13 elements, and ring 110 is shown as including 26 elements. For simplicity and clarity, the routing for only half of the array elements are shown in FIG. 8A. Furthermore, in the exemplary embodiment shown in FIG. 8A, the optical traces are 0.5 μm wide, and as seen, are spaced apart from one another. For example, as shown in expanded view of FIG. 8B, the distances between a few adjacent optical traces (e.g., waveguides) are shown as being equal to 3.63 μm, 1.12 μm, 0.98 μm, 1.37 μm, and 1.04 μm. As is also shown in FIG. 8B, there is abundant space to include arcs so as to avoid sharp bends in order to minimize signal loss. It is further seen from FIG. 8B that sufficient space exists to make the optical PGPA larger by adding more elements and optical traces in order to further improve its characteristics.

Due to its improved structural and performance characteristics, an optical PGPA is ideally suited for use in applications that require relatively large unit cells. A unit cell is understood herein to refer to a transmitting or receiving element together with other optical processing components, such as phase modulators. As is seen from FIGS. 8A and 8B, a relatively large unused space exits between the elements which enables the array elements to be further increased in size if additional improvements in the characteristics of the receiving patterns is desired. The unused space may also be used for adding other components, such as modulators, in order to make an overall design smaller.

Figure 9A:
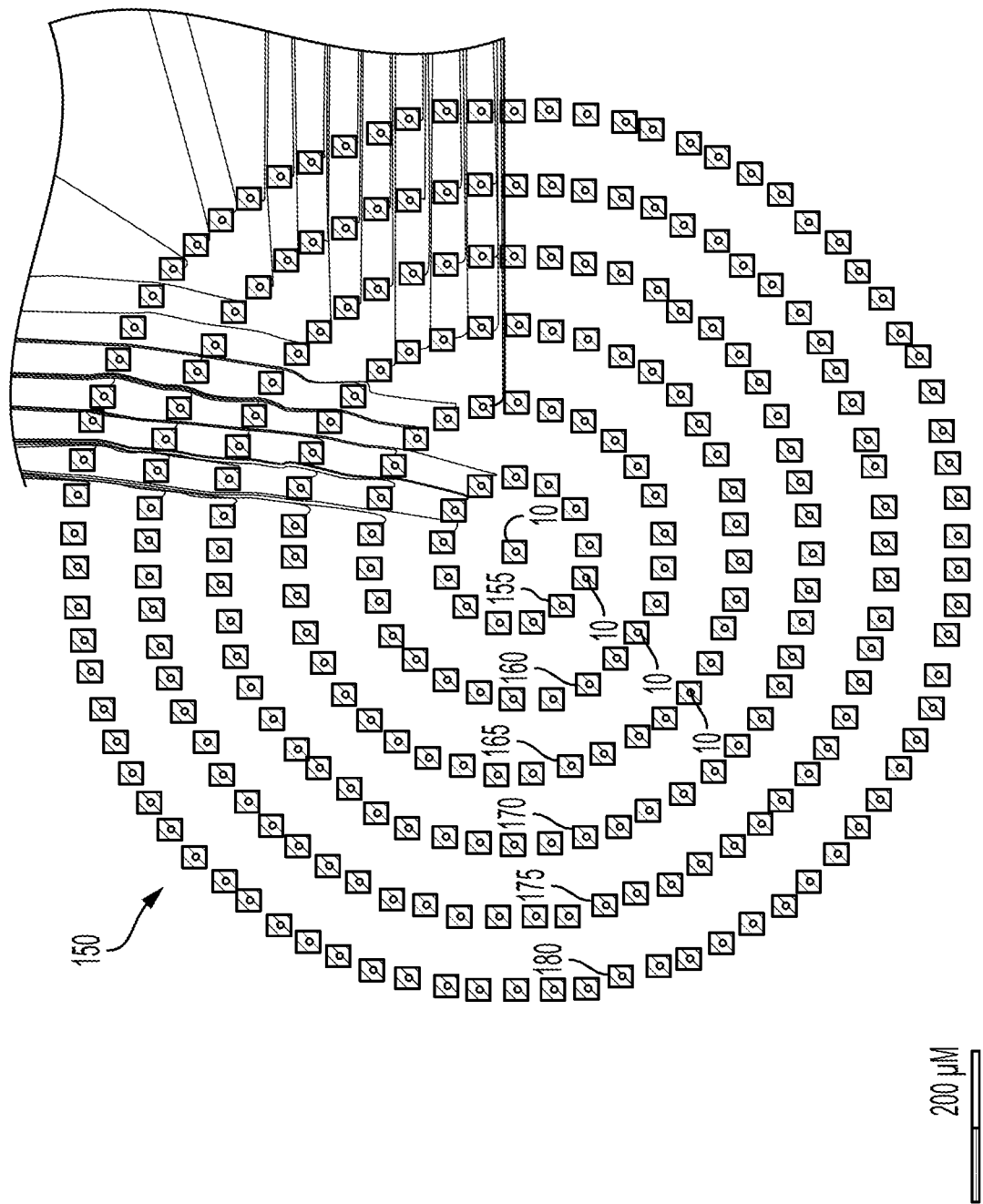
FIG. 9A shows a layout of an exemplary optical polar phased array grid, in accordance with one exemplary embodiment of the present invention.

FIG. 9A shows a layout of an optical PGPA 150, in accordance with one exemplary embodiment of the present invention. Optical PGPA 150 is shown as including, in part, six concentric circles (rings), namely rings 155, 160, 165, 170, 175 and 180, along the periphery of each of which a multitude of optical elements 10 is disposed. As is seen from FIG. 9A, ring 155 is shown as including 13 elements; ring 160 is shown as including 26 elements; ring 165 is shown as including 39 elements, and the like. Optical polar phased array 150 is referred to as a 6×13 array and has an exemplary unit cell size of 30 μm×30 μm.

Figure 9B:
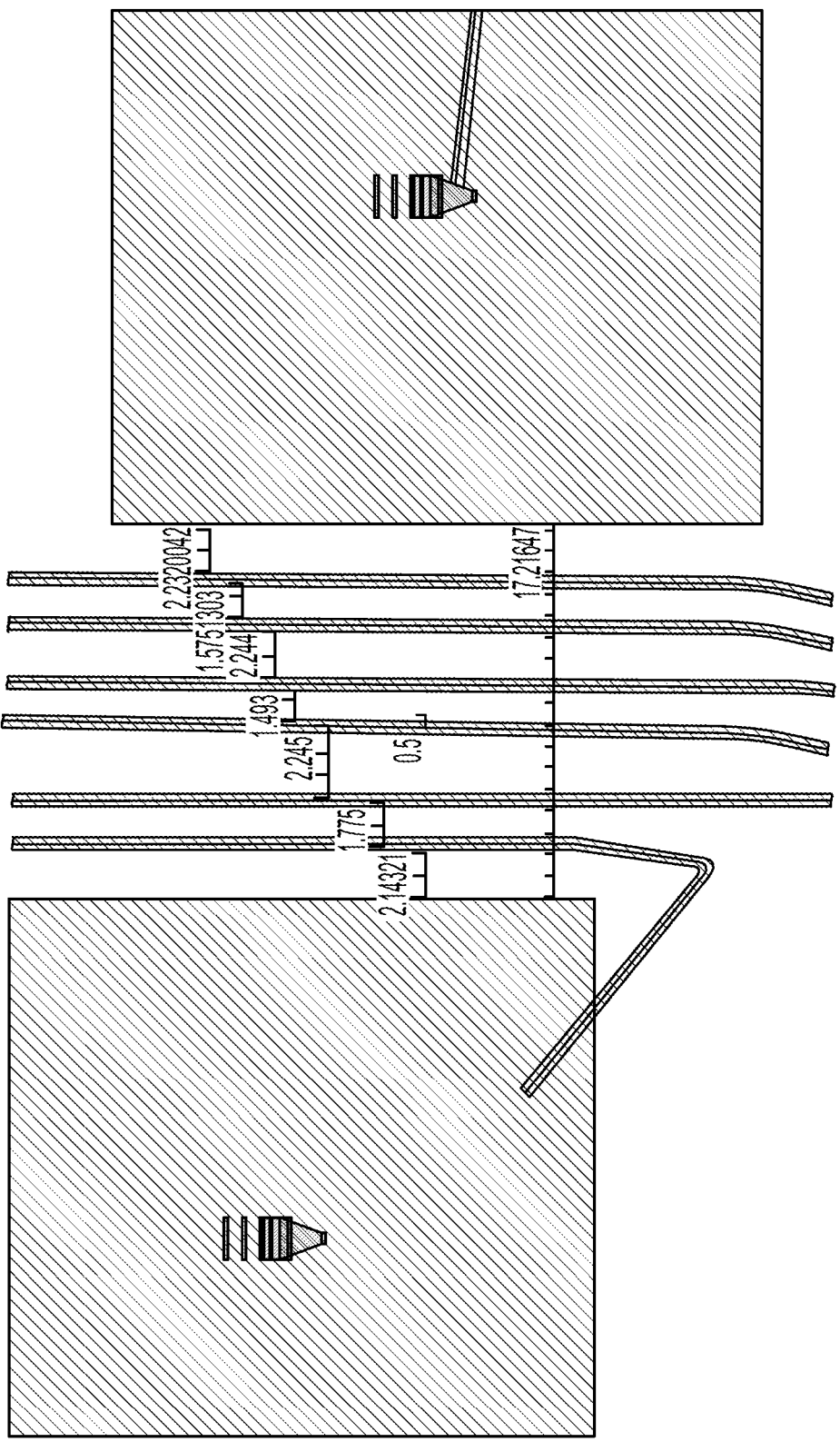
FIG. 9B shows an expanded view of a portion of the layout shown in FIG. 9A.

Optical polar phased array 150 is also shown as including an element 10 at its center. For simplicity and clarity, only one quarter of the array routing is shown. The increased unit cell size of optical polar phased array 150 relative to that of optical polar phased array 100 enables the placement of additional components within the array thereby reducing its overall size. As shown in expanded view of FIG. 9B, the distances between a few adjacent optical traces are shown as being equal to 2.14 μm, 1.77 μm, 2.24 μm, 1.48 μm, 1.57 μm and 2.23 μm.

Figure 10A:
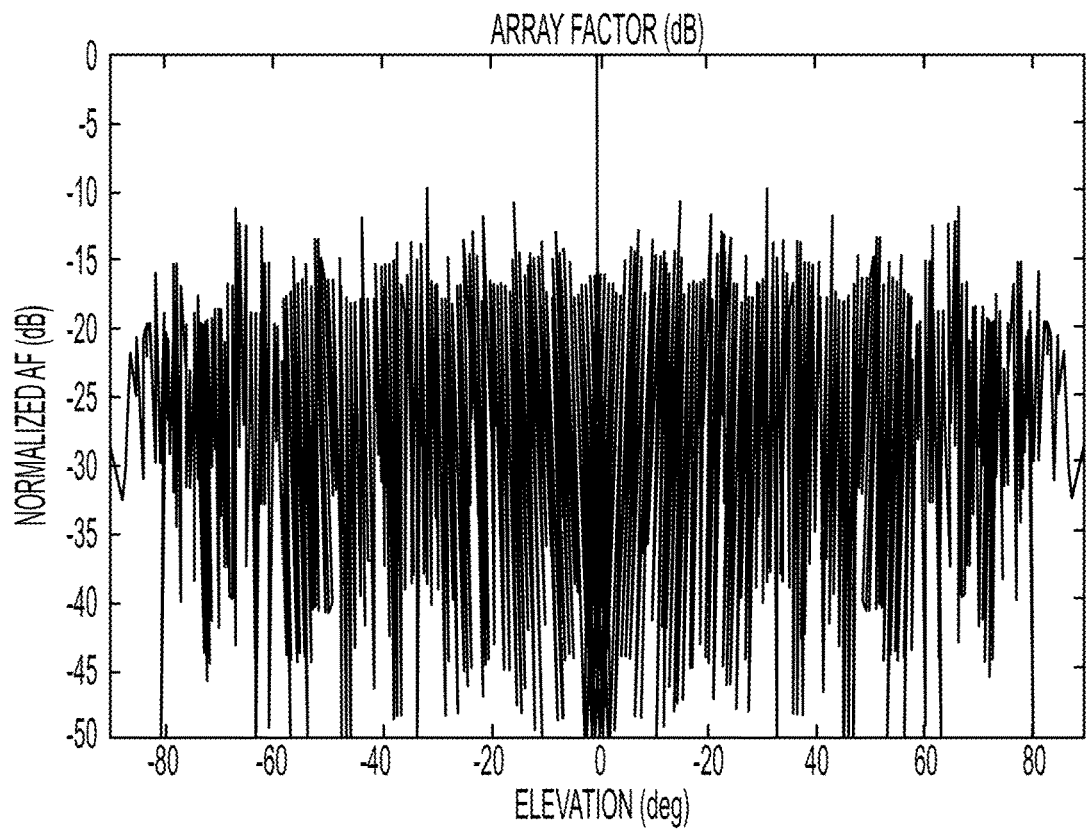
FIG. 10A shows the array factor associated with the optical polar phased array of FIG. 9A.
Figure 10B:
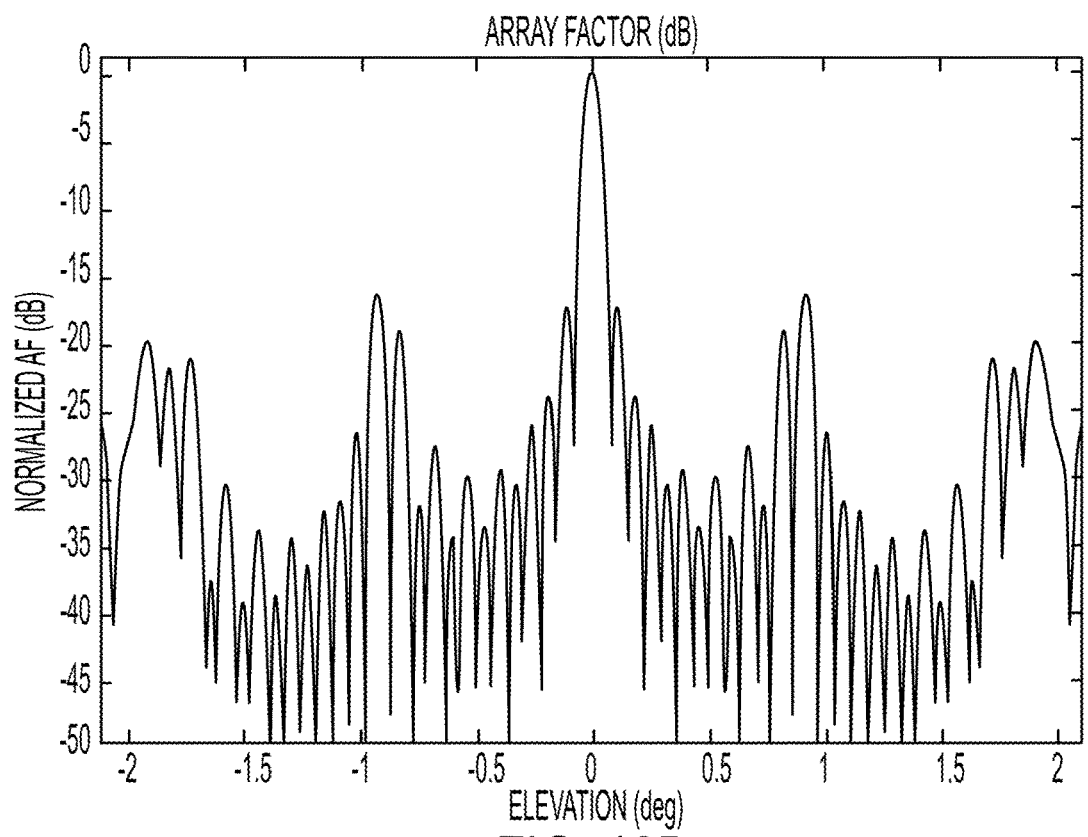
FIG. 10B shows the characteristics of the plot shown in FIG. 10A around the main beam.

FIG. 10A shows the array factor for the optical polar phased array 150 shown in FIG. 9A with ($\theta_0$, $\varphi_0$=0°, 0°) with ($\varphi$=0°). The beamwidth of the array is shown as being 0.08° which is highly effective for use in ultra-high resolution applications. The worst-case sidelobe is shown as being at −10 dB. Therefore, the field of view is not degraded. FIG. 10B shows the characteristics of the plot shown in FIG. 10A around the main beam.

A PGPA, in accordance with the embodiments of the present invention, is ideally suited for thermal modulation. Thermal modulators may be placed on a layer behind the PGPA for precise heating. Such a placement is not feasible in rectangular arrays because grating lobes prohibit a large element spacing. Thus, thermal modulators for rectangular phased arrays are placed external to the array thus consuming valuable space.

A PGPA, in accordance with embodiments of the present invention, is adapted to accommodate thermal modulators both within the array, as well as behind the array—thus freeing up even more space for additional components. This can reduce the area requirement of an optical phased array by a factor of ten in some examples. A pair of modulators and a single receiving/transmitting element may be placed, for example, in a 30 μm×30 μm area. Therefore, the examples described above may be readily used in an optical phased array that includes both amplitude and phase modulation.

Pattern Multiplication for Transceiver PGPA Imagers

The examples described above apply equally to an array of transmitting elements, or receiving elements, or transmitting/receiving (transceiver) elements. In a PGPA that includes an array of transceiver elements, a transceiver array transmits light to a target. The reflected light is collected and received by a receiver array. The received information is the Fourier transform of the far field image. The image of the target is then reconstructed using the inverse Discrete Fourier Transform.

When the transmitter and receiver arrays are close to each other, the far field sees the two arrays as essentially the same array in the same location. Thus, the effective array factor of the transceiver is the product of the array factors of the receiver and transmitter. This makes it possible to remove nearly, for example, −15 dB sidelobes that was shown in any of the examples above, thus further increasing the reliability of the PGPA. In accordance with one embodiment of the present invention, a PGPA includes a combination of arrays whose major sidelobes do not line up.

Figure 11A:
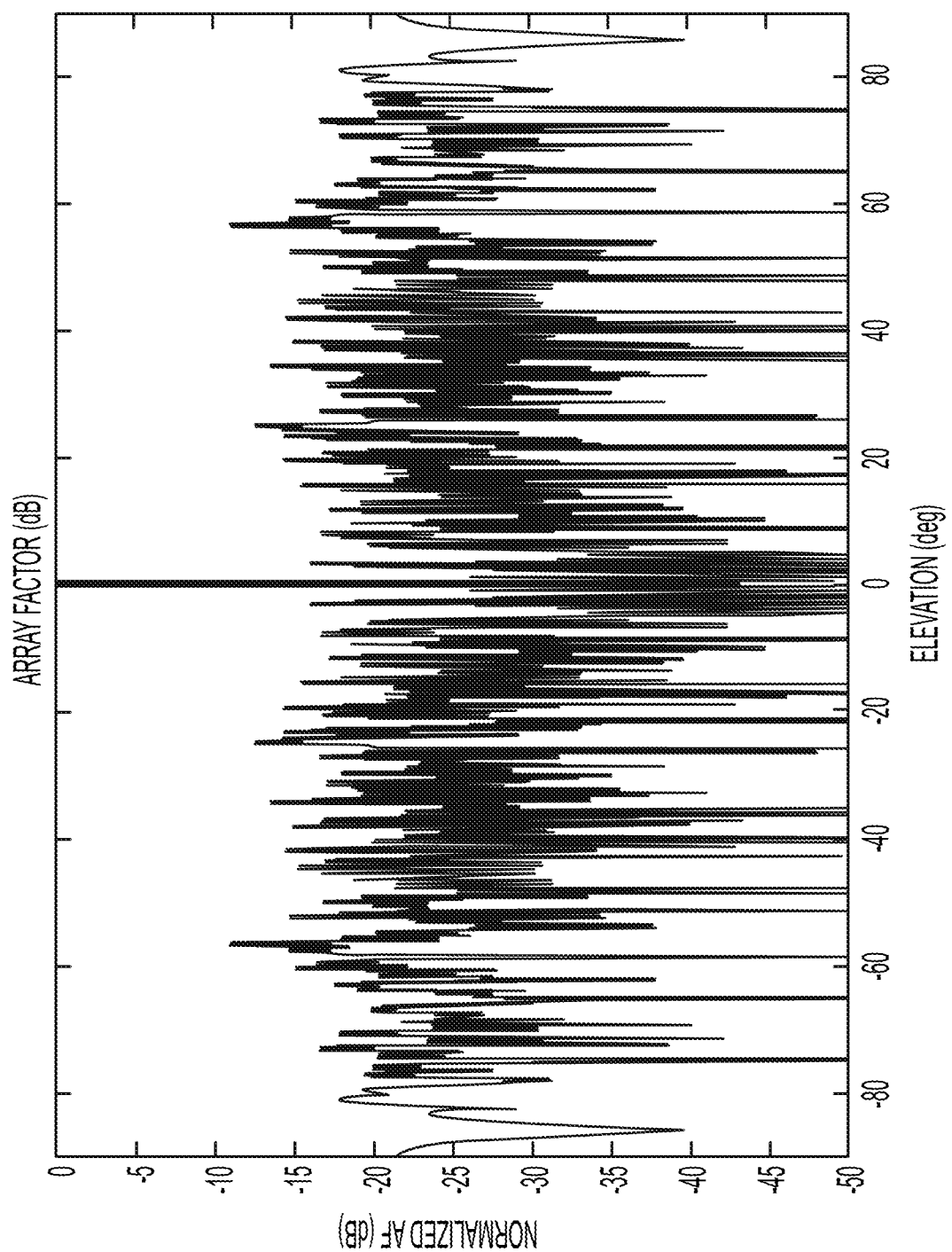
FIG. 11A shows the array factor of an optical polar phased array grid, in accordance with one embodiment of the present invention.
Figure 11B:
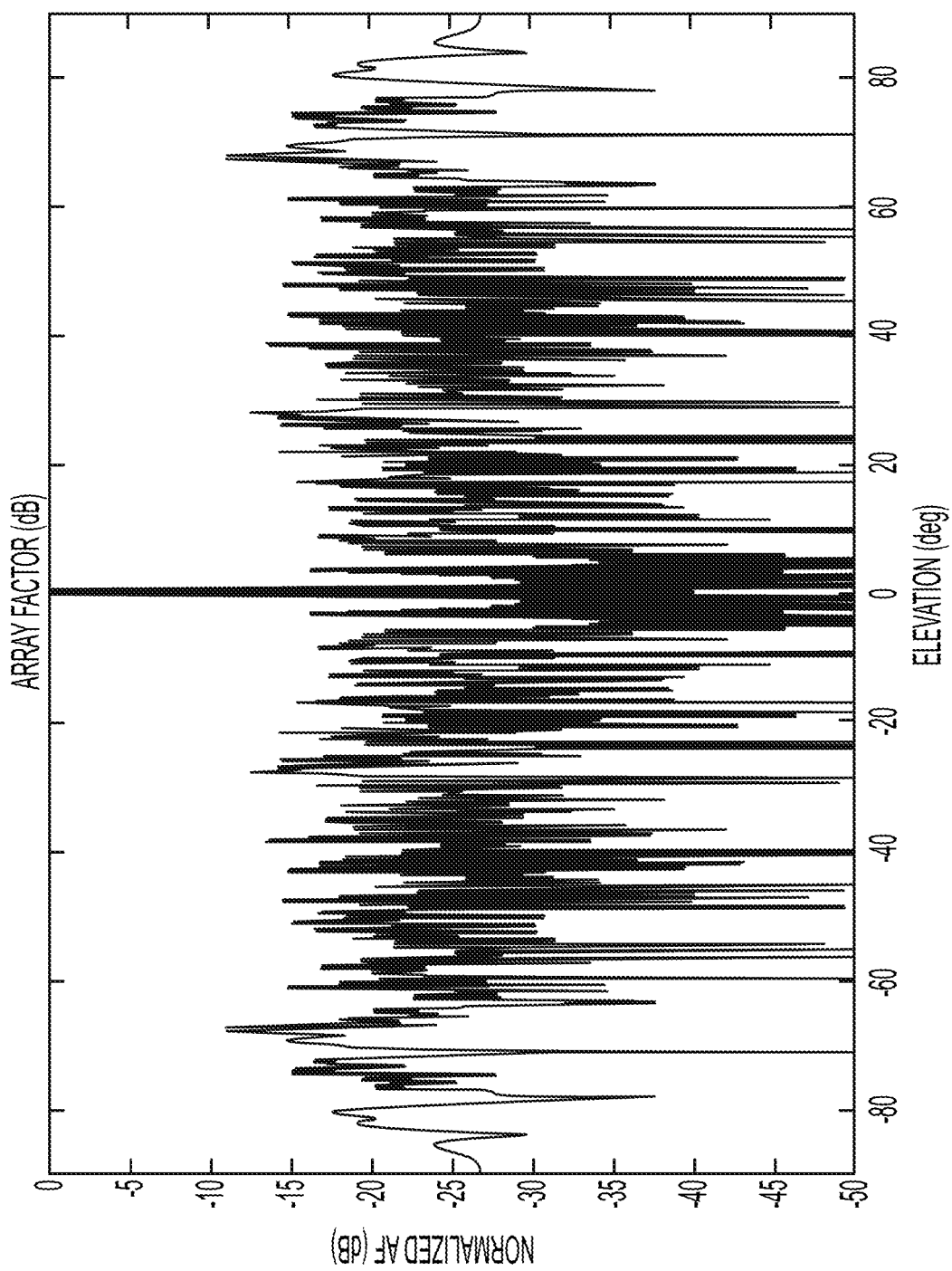
FIG. 11B shows the array factor of an optical polar phased array grid, in accordance with one embodiment of the present invention.
Figure 11C:
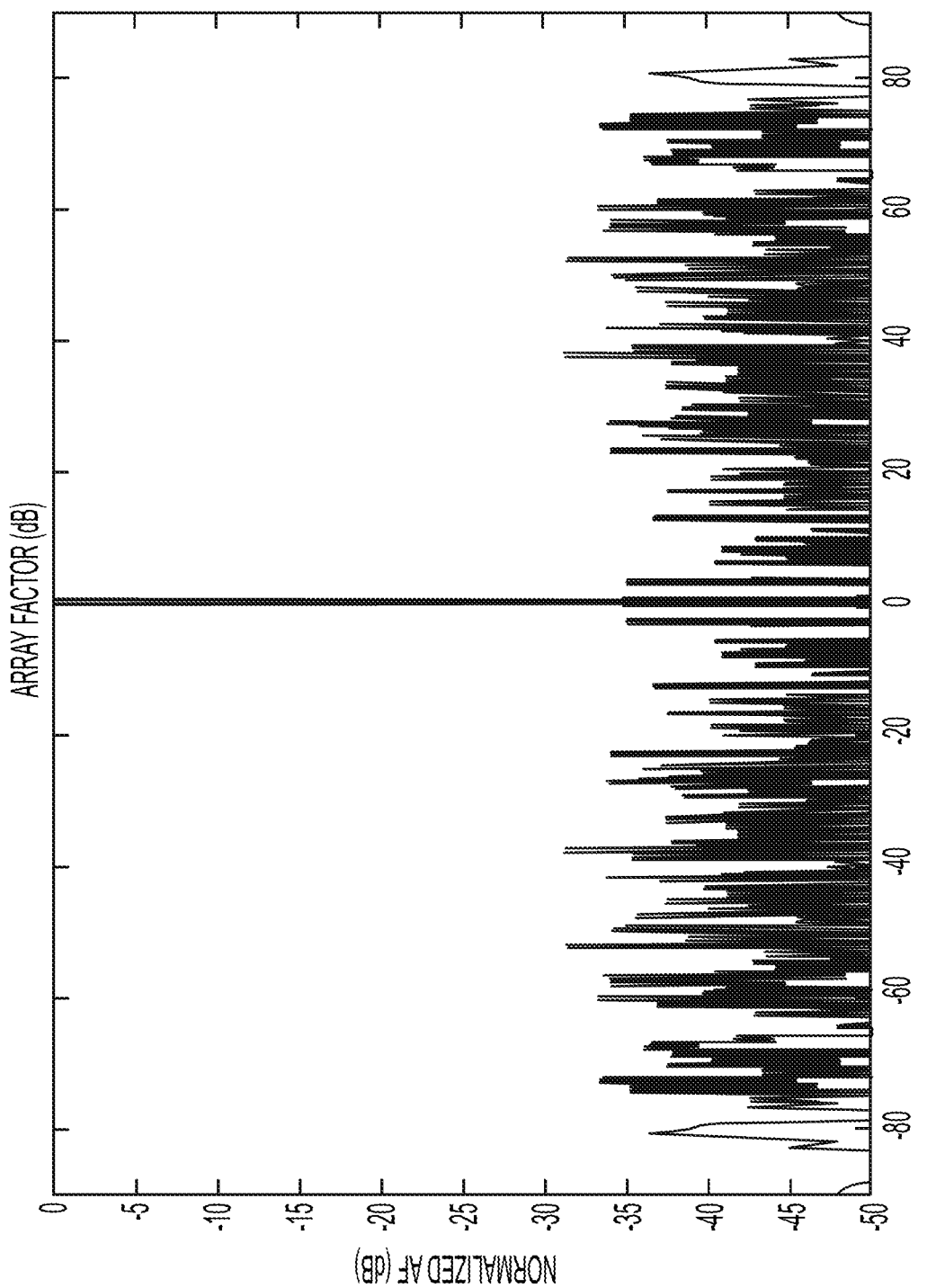
FIG. 11C shows the array factor of the product of the optical polar phased arrays of FIGS. 11A and 11B when the two array are positioned adjacent one another, in accordance with one embodiment of the present invention.
Figure 12A:
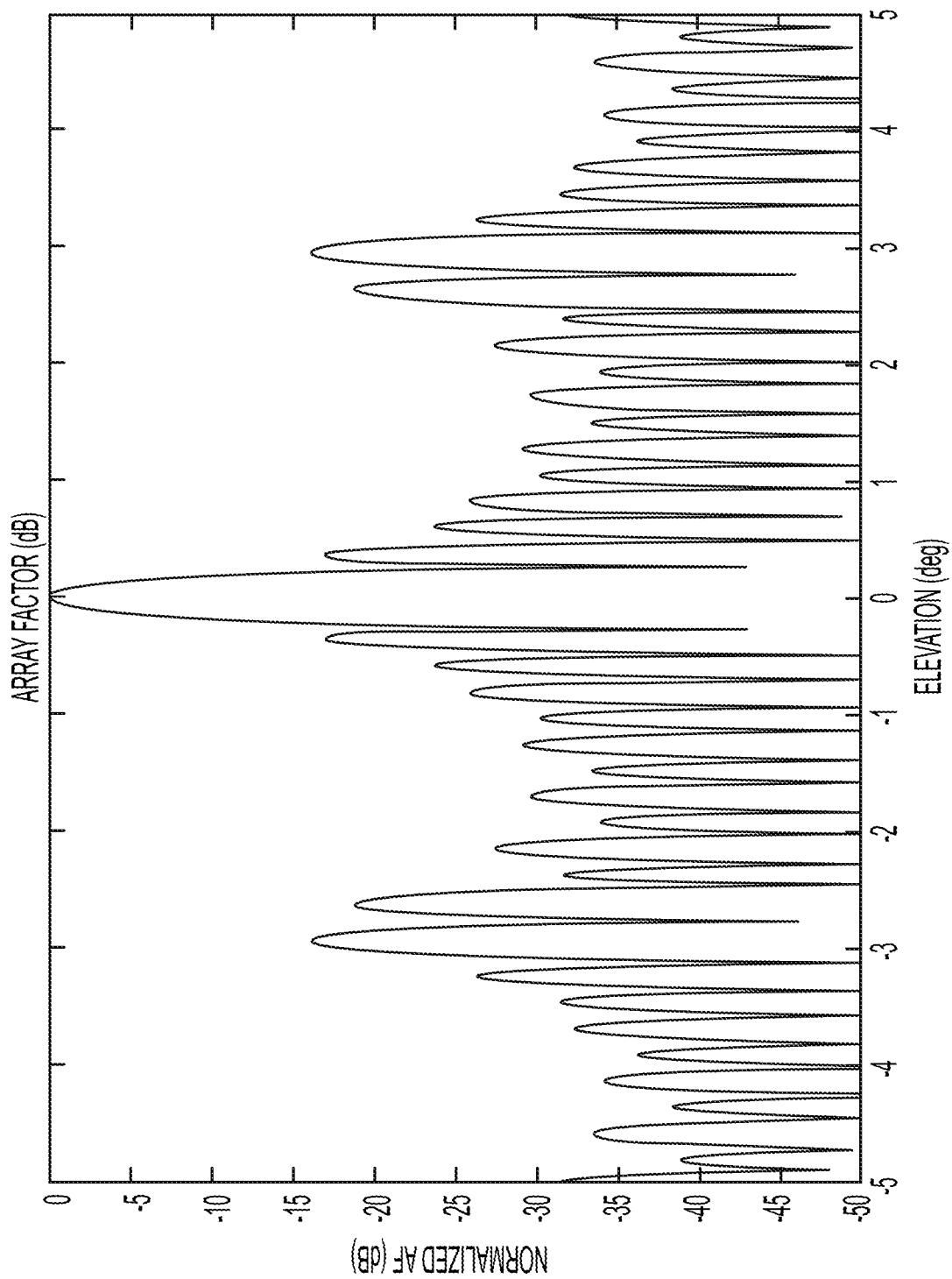
FIGS. 12A, 12B and 12C are expanded views of the array factors of FIGS. 11A, 11B and 11C near the 3-dB beamwidth.
Figure 12B:
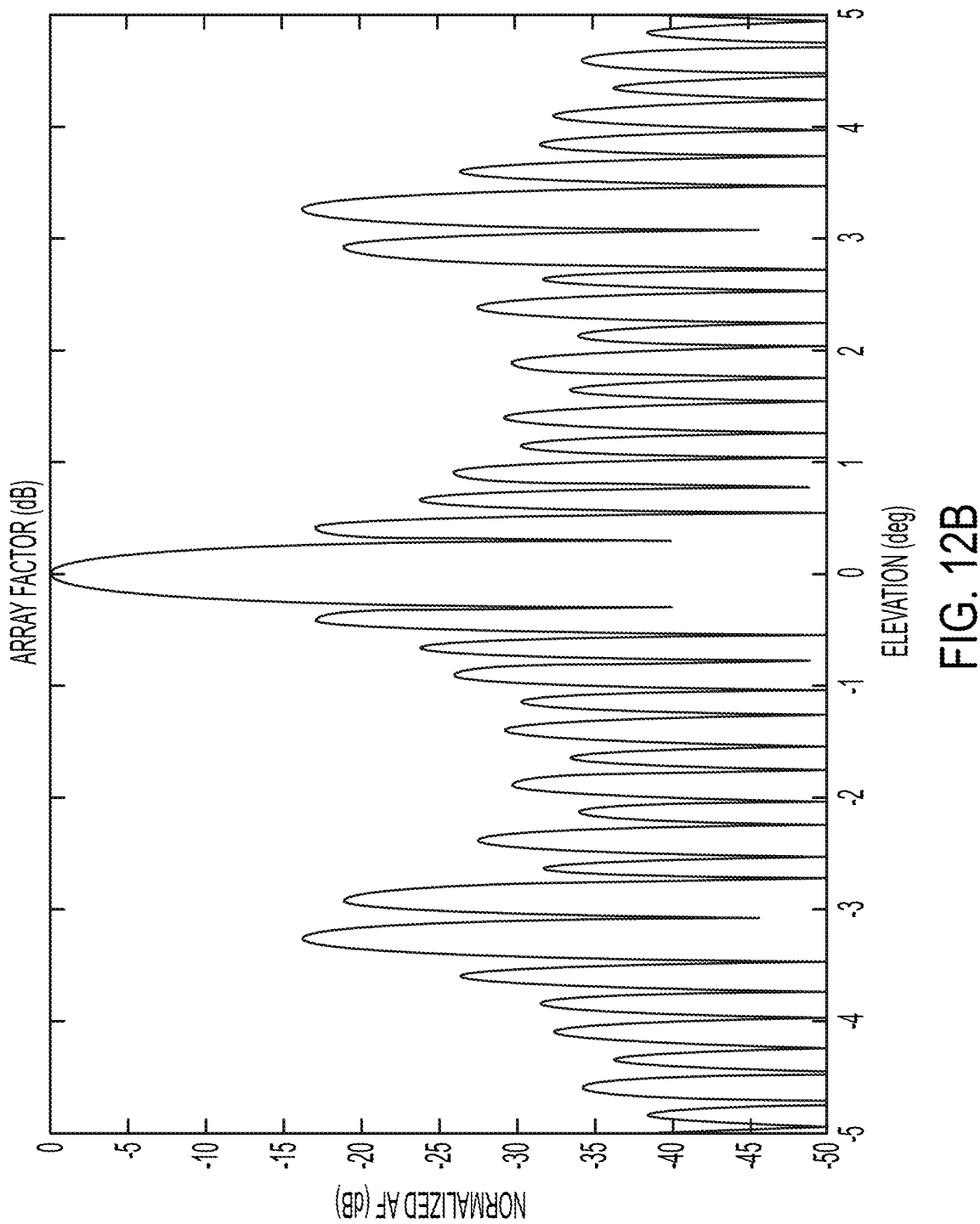
Figure 12C:
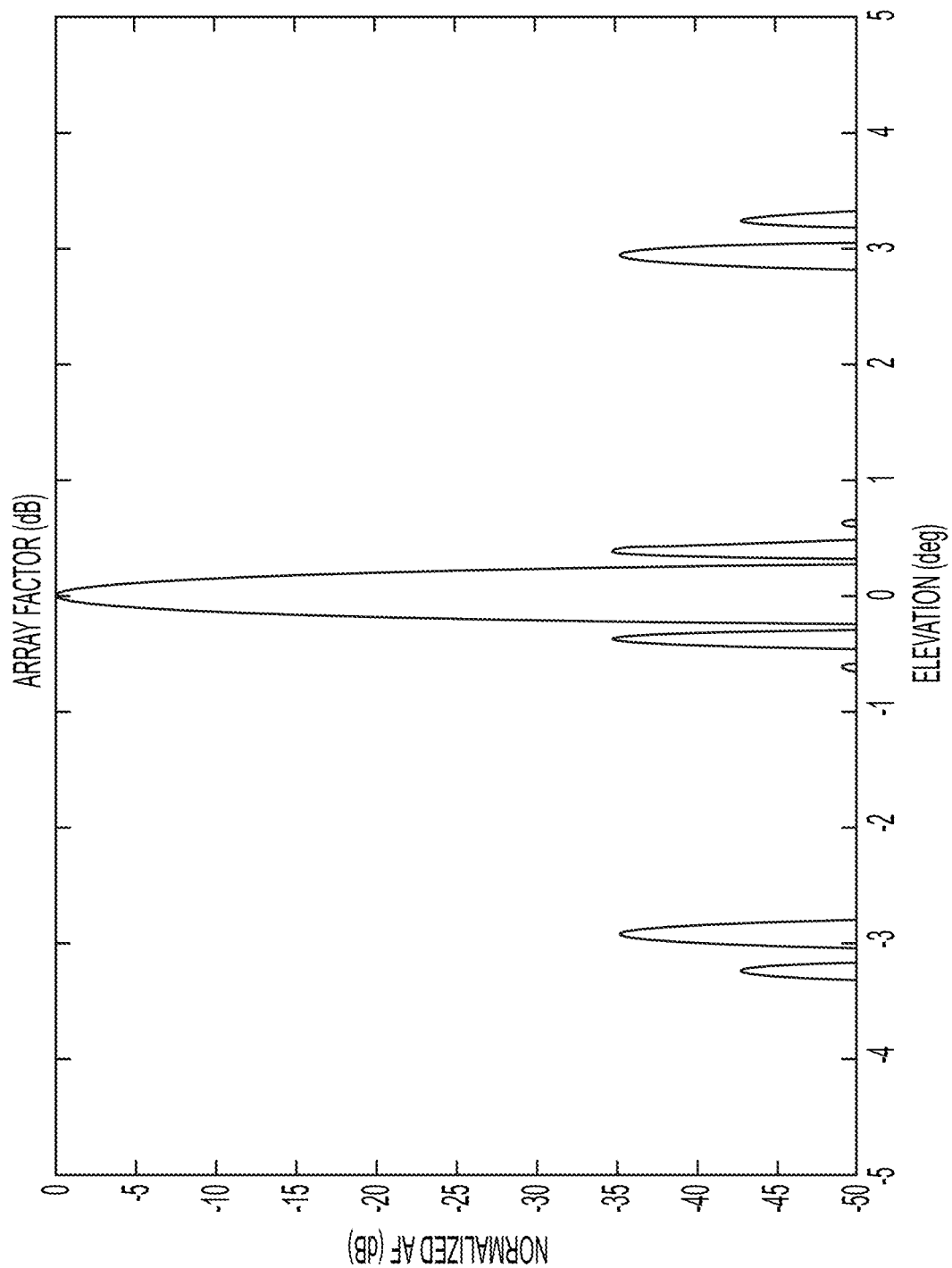

Referring to FIG. 9A, PGPA 150 is shown and described above as 6×13 array with intra-radial spacing of 31 μm. FIG. 11A shows an array factor of such a PGPA 150. Assume PGPA 150 is positioned adjacent another PGPA that has a 6×13 but with an intra-radial spacing of 28 μm; FIG. 11B shows the array factor of such a PGPA. The product array, whose array factor characteristics is shown in green in FIG. 11C, has all its sidelobes under −30 dB while maintaining the narrow beamwidth, thereby making the combined arrays that form a transceiver extremely versatile. This array factor is nearly ideal, with extremely narrow beamwidth and almost no sidelobes. FIG. 12A, 12B show expanded view of the array factors of FIGS. 11A, 11B, and 11C respectively near the 3-dB beamwidth.

In accordance with one embodiment, a PGPA adapted for array multiplication may include arrays that are interlaced within the same circular structure. In one embodiment, adjacent rings would belong to different arrays. For example, the transmitter (or receiver) array would include rings with radii $a_1$=10 μm, $a_2$=30 μm, $a_3$=50 μm . . . , and the receiver (or transmitter) array would include rings with radii $a_1$=20 μm, $a_2$=40 μm, $a_3$=60 μm . . . . In accordance with another embodiment, the receiving and transmitting arrays have different radial spacing (i.e. $a_n$=$na_0$) with parameter $a_0$ selected so that the elements do not overlap. Both embodiments, generate high resolution transceivers (narrow beamwidth) without grating lobes and with very low sidelobe levels (i.e. full field of view).

Adding Non-Uniformity to the PGPA

Breaking the uniformity of a PGPA may decrease sidelobe levels and beamwidth (see Equation (18)). An array may be made more random by turning $a_m$ and $\varphi_{m,n}$ into random variables:

$$a_m \sim \mathcal{N}(ma_0, \sigma_r)$$
$$\varphi_{m,n} \sim \mathcal{N}\left(2\pi \frac{n}{N(m)}, \sigma_\varphi\right)$$

In the above equations, parameters $\sigma_r$ and $\sigma_\varphi$ represent variances that add randomness to each element's radius and angle, respectively. For a uniform PGPA, both of these variances (randomness) may be set to, for example, to zero. Alternatively, these variances may be tuned to optimize for a desired combination of lower sidelobe levels and a smaller beamwidth. For example, for a uniform PGPA with M=5, $n_0$=17, $a_0$=40 μm and λ=1550 nm, a maximum sidelobe level of −13.3 dB is achieved.

By setting $\sigma_r$ to 5 μm and $\sigma_\varphi$ to 1°, the maximum sidelobe level may be lowered to −17.7 dB. It is understood that the same variance settings may give rise to different array parameters due to the randomness of this process. Therefore, a Monte Carlo simulation may be performed to achieve a desirable performance for a given set of variances. But it is understood that a small perturbation in element placement may improve array characteristics. Furthermore, although randomness is assumed to have a normal distribution in the above examples, it is understood that different distribution patterns may be used. Adding randomness can be a valuable tool for tuning array parameters when the pattern multiplication technique is not feasible. Adding randomness can also be used together with pattern multiplication.

The above embodiments of the present invention are illustrative and not limitative. The above embodiments of the present invention are not limited by the number of concentric circles of the array, nor by the number of elements placed along a periphery of each concentric circle. Furthermore, although not shown in the drawings, in some embodiments, the elements of a PGPA may be positioned along a single circle. The above embodiments of the present invention are not limited by the wavelength or frequency of the signal being transmitted. Other modifications and variations will be apparent to those skilled in the art and are intended to fall within the scope of the appended claims.

What is claimed is:

1. An optical phased array comprising:
a first plurality of optical phased array transmitting elements positioned along a periphery of a first circular path and configured to steer an optical beam by varying phases of optical signals transmitted by the plurality of optical phased array transmitting elements; and
a first plurality of optical phased array receiving elements each adapted to receive a reflection of the optical beam.

2. The optical phased array of claim 1 further comprising:
a second plurality of optical phased array transmitting and receiving elements positioned along a periphery of a second circular path concentric with the first circular path, said second circular path having a radius that is greater than a radius of the first circular path.

3. The optical phased array of claim 2 further comprising:
a third plurality of optical phased array transmitting and receiving elements positioned along a periphery of a third circular path concentric with the first and second circular paths, said third circular path having a radius that is greater than the radius of the second circular path.

4. The optical phased array of claim 2 wherein the second plurality of optical phased array transmitting and receiving elements is greater than the first plurality of optical phased array transmitting and receiving elements by N phased array transmitting and receiving elements, wherein N is an integer greater than or equal to 1.

5. The optical phased array of claim 3 wherein the third plurality of phased array optical transmitting and receiving elements is greater than the second plurality of phased array optical transmitting and receiving elements by M phased array transmitting and receiving elements, wherein M is an integer greater than or equal to 1.

6. The optical phased array of claim 2 wherein a line from a center of the first circular path to a first one of the first plurality of phased array transmitting and receiving elements crosses a first one of the second plurality of phased array transmitting and receiving elements.

7. The optical phased array of claim 1 further comprising:
a phased array transmitting and receiving element positioned at a center of the first circular path.

8. The optical phased array of claim 1 wherein said first plurality of phased array optical transmitting and receiving elements are uniformly distributed along the periphery of the first circular path.

9. The optical phased array of claim 2 wherein said second plurality of phased array optical transmitting and receiving elements are uniformly distributed along the periphery of the second circular path.

10. The optical phased array of claim 3 wherein said third plurality of phased array optical transmitting and receiving elements are uniformly distributed along the periphery of the third circular path.

11. The optical phased array of claim 2 wherein said first and second circular paths are coplanar.

12. The optical phased array of claim 3 wherein said first, second and third circular paths are coplanar.

13. The optical phased array of claim 2 wherein said first circular path is on a first plane different from a second plane in which the second circular path is positioned.

14. The optical phased array of claim 2 wherein a minima associated with the second circular path is substantially aligned with a secondary maxima associated with the first circular path.

15. An optical phased array comprising:
a first plurality of optical phased array transmitting elements positioned along a periphery of a first circular path and configured to steer an optical beam by varying phases of optical signals transmitted by the plurality of optical phased array transmitting elements; and
a second plurality of optical phased array transmitting elements positioned along a periphery of a second circular path concentric with the first circular path, said second circular path having a radius that is greater than a radius of the first circular path.

16. The optical phased array of claim 15 further comprising:
a third plurality of optical phased array transmitting elements positioned along a periphery of a third circular path concentric with the first and second circular paths, said third circular path having a radius that is greater than a radius of the second circular path.

17. A method of wave-front generation or reception, the method comprising:
transmitting an optical signal from each of a first plurality of optical phased array transmitting elements positioned along a periphery of a first circular path and configured to steer an optical beam by varying phases of optical signals transmitted by the plurality of optical phased array transmitting elements.

18. The method of claim 17 further comprising:
transmitting an optical signal from each of a second plurality of phased array optical transmitting elements positioned along a periphery of a second circular path concentric with the first circular path, said second circular path having a radius that is greater than a radius of the first circular path.

19. The method of claim 18 further comprising:
transmitting an optical signal from each of a third plurality of optical phased array transmitting elements positioned along a periphery of a third circular path concentric with the first and second circular paths, said third circular path having a radius that is greater than the radius of the second circular path.

20. The method of claim 18 wherein the second plurality of optical phased array transmitting elements is greater than the first plurality of optical phased array transmitting elements by N transmitting elements, wherein N is an integer greater than or equal to 1.

21. The method of claim 19 wherein the third plurality of optical phased array transmitting elements is greater than the second plurality of optical phased array transmitting elements by M phased array transmitting elements, wherein M is an integer greater than or equal to 1.

22. The method of claim 18 further comprising:
transmitting an optical signal from a phased array transmitting element positioned at a center of the first circular path.

23. The method of claim 17 wherein said first plurality of phased array optical transmitting elements are uniformly distributed along the periphery of the first circular path.

24. The method of claim 18 wherein said second plurality of optical phased array transmitting elements are uniformly distributed along the periphery of the second circular path.

25. The method of claim 19 wherein said third plurality of optical phased array transmitting elements are uniformly distributed along the periphery of the third circular path.

26. The method of claim 18 wherein said first and second circular paths are coplanar.

27. The method of claim 18 wherein said first circular path is on a first plane different from a second plane in which the second circular path is positioned.

28. The method of claim 19 wherein said first, second and third circular paths are coplanar.

29. The method of claim 18 wherein a minima associated with the second circular path is substantially aligned with a secondary maxima associated with the first circular path.

30. A method of wave-front generation or reception, the method comprising:
- transmitting an optical signal from each of a first plurality of optical phased array transmitting elements positioned along a periphery of a first circular path, said plurality of optical signal transmitting elements configured to steer an optical beam by varying phases of optical signals transmitted by the plurality of optical phased array transmitting elements; and
- receiving the optical signal transmitted by the first plurality of optical phased array transmitting elements via a first plurality of optical phased array receiving elements positioned along a periphery of a second circular path concentric with the first circular paths, said second circular path having a radius that is longer than a radius of the first circular path.

31. The method of claim 30 further comprising:
- transmitting an optical signal from each of a second plurality of optical phased array transmitting elements positioned along a periphery of a third circular path concentric with the first and second circular paths; and
- receiving the optical signal transmitted by the second plurality of optical phased array transmitting elements via a second plurality of optical phased-array receiving elements, said third circular path having a radius that is longer than the radius of the second circular path.

* * * * *